US012743923B2

(12) United States Patent
Uss

(10) Patent No.: US 12,743,923 B2
(45) Date of Patent: Sep. 22, 2026

(54) ELECTRONIC GAMING SYSTEMS AND METHODS WITH A WHEEL BONUS FEATURE AND PICK FEATURE ENHANCEMENTS

(71) Applicant: Aristocrat Technologies, Inc., Las Vegas, NV (US)

(72) Inventor: Jeffrey Uss, Liberty Hill, TX (US)

(73) Assignee: Aristocrat Technologies, Inc., Las Vegas, NV (US)

(*) Notice: Subject to any disclaimer, the term of this patent is extended or adjusted under 35 U.S.C. 154(b) by 531 days.

(21) Appl. No.: 18/066,838

(22) Filed: Dec. 15, 2022

(65) Prior Publication Data

US 2024/0078866 A1 Mar. 7, 2024

Related U.S. Application Data

(60) Provisional application No. 63/374,471, filed on Sep. 2, 2022.

(51) Int. Cl.
*G07F 17/32* (2006.01)

(52) U.S. Cl.
CPC ...... *G07F 17/3213* (2013.01); *G07F 17/3209* (2013.01); *G07F 17/3265* (2013.01); *G07F 17/3267* (2013.01)

(58) Field of Classification Search
CPC ....................................................... G07F 17/34
See application file for complete search history.

(56) References Cited

U.S. PATENT DOCUMENTS

| | | | | |
|---|---|---|---|---|
| 6,599,185 B1 * | 7/2003 | Kaminkow | G07F 17/32 463/16 |
| 8,262,458 B2 * | 9/2012 | Rodgers | G07F 17/34 463/19 |
| 9,245,412 B2 * | 1/2016 | Holsclaw | G07F 17/3262 |
| 2002/0052232 A1 * | 5/2002 | Kaminkow | G07F 17/32 463/20 |
| 2004/0002372 A1 * | 1/2004 | Rodgers | G07F 17/3267 463/20 |
| 2005/0059456 A1 * | 3/2005 | Mead | G07F 17/3244 463/16 |

(Continued)

OTHER PUBLICATIONS

IGT, Wheel of Fortune Gold Spin: Deluxe Double Gold Slot Machine, Global Gaming Business Magazine, Mar. 18, 2021, 1 page.

*Primary Examiner* — Milap Shah
(74) *Attorney, Agent, or Firm* — Armstrong Teasdale LLP

(57) ABSTRACT

An electronic gaming device that includes a display device, an input device, a memory device, and a processor is described. The processor is configured to display a base game outcome on the display device, the base game outcome comprising a plurality of symbols included on a plurality of reels. The processor is also configured to cause the display of a feature game comprising a plurality of user selectable pick icons and a wheel, wherein the wheel comprises a plurality of prizes displayed at a plurality of wheel segments and a first wheel pointer. The processor is also configured to receive by the input device a selection of a pick icon of the plurality of pick icons and, based on the selection, display an output associated with the pick icon, wherein the output comprises a wheel enhancement. The processor is further configured to apply the wheel enhancement to the feature game.

19 Claims, 35 Drawing Sheets

2900

1604

701

(56) References Cited

U.S. PATENT DOCUMENTS

| | | | | |
|---|---|---|---|---|
| 2005/0075159 | A1* | 4/2005 | Kaminkow | G07F 17/32<br>463/16 |
| 2006/0258434 | A1* | 11/2006 | Jaffe | G07F 17/3244<br>463/16 |
| 2006/0281528 | A1* | 12/2006 | Hall | G07F 17/32<br>463/20 |
| 2007/0015566 | A1* | 1/2007 | Baerlocher | G07F 17/32<br>463/20 |
| 2007/0069460 | A1* | 3/2007 | Hein | G07F 17/32<br>273/142 R |
| 2011/0218027 | A1* | 9/2011 | Manz | G07F 17/3213<br>463/19 |
| 2011/0230249 | A1* | 9/2011 | Harris | G07F 17/34<br>463/19 |
| 2012/0122545 | A1* | 5/2012 | Watkins | G07F 17/3211<br>463/20 |
| 2015/0356829 | A1* | 12/2015 | Caputo | A63F 13/30<br>463/16 |
| 2018/0089947 | A1 | 3/2018 | Mariscal | |
| 2019/0026974 | A1 | 1/2019 | Casey | |
| 2022/0284774 | A1* | 9/2022 | Bolling, Jr. | G07F 17/34 |
| 2023/0343168 | A1* | 10/2023 | Milosevich | G07F 17/3267 |

* cited by examiner

ELECTRONIC GAMING SYSTEMS AND METHODS WITH A WHEEL BONUS FEATURE AND PICK FEATURE ENHANCEMENTS

CROSS REFERENCE TO RELATED APPLICATIONS

This application claims the benefit of priority to U.S. Provisional Patent Application No. 63/374,471, filed Sep. 2, 2022, the contents and disclosure of which are incorporated by reference herein in their entirety.

TECHNICAL FIELD

The field of disclosure relates generally to electronic gaming, and more specifically, to electronic gaming systems and methods that include executing and displaying a wheel-based feature game that includes pick feature enhancements.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device, an input device, a memory device storing instructions and a plurality of wheel enhancements, and a processor in communication with the display device, the input device, and the memory device. When the instructions are executed by the processor, the processor is configured to display a base game outcome on the display device, the base game outcome comprising a plurality of symbols included on a plurality of reels. The processor is also configured to determine that the plurality of symbols includes one or more feature game trigger symbols and, in response to the determination, cause the display of a feature game comprising a plurality of user selectable pick icons and a wheel, wherein the wheel comprises a plurality of prizes displayed at a plurality of wheel segments and a first wheel pointer. The processor is also configured to receive by the input device a selection of a pick icon of the plurality of pick icons and, based on the selection, display an output associated with the pick icon, wherein the output comprises a wheel enhancement of the plurality of wheel enhancements. The processor is further configured to apply the wheel enhancement to the feature game.

In another aspect, a method of electronic gaming is provided. The method includes causing a base game outcome to be displayed on a display device, the base game outcome comprising a plurality of symbols included on a plurality of reels. The method also includes determining that the plurality of symbols includes one or more feature game trigger symbols, and, in response to the determination, causing display of a feature game comprising a plurality of user selectable pick icons and a wheel, wherein the wheel comprises a plurality of prizes displayed at a plurality of wheel segments and a first wheel pointer. The method also includes receiving by an input device a selection of a pick icon of the plurality of pick icons, and based on the selection, causing the display of an output associated with the pick icon, wherein the output comprises a wheel enhancement of a plurality of wheel enhancements. The method further includes applying the wheel enhancement to the feature game.

DETAILED DESCRIPTION

Figure 1:
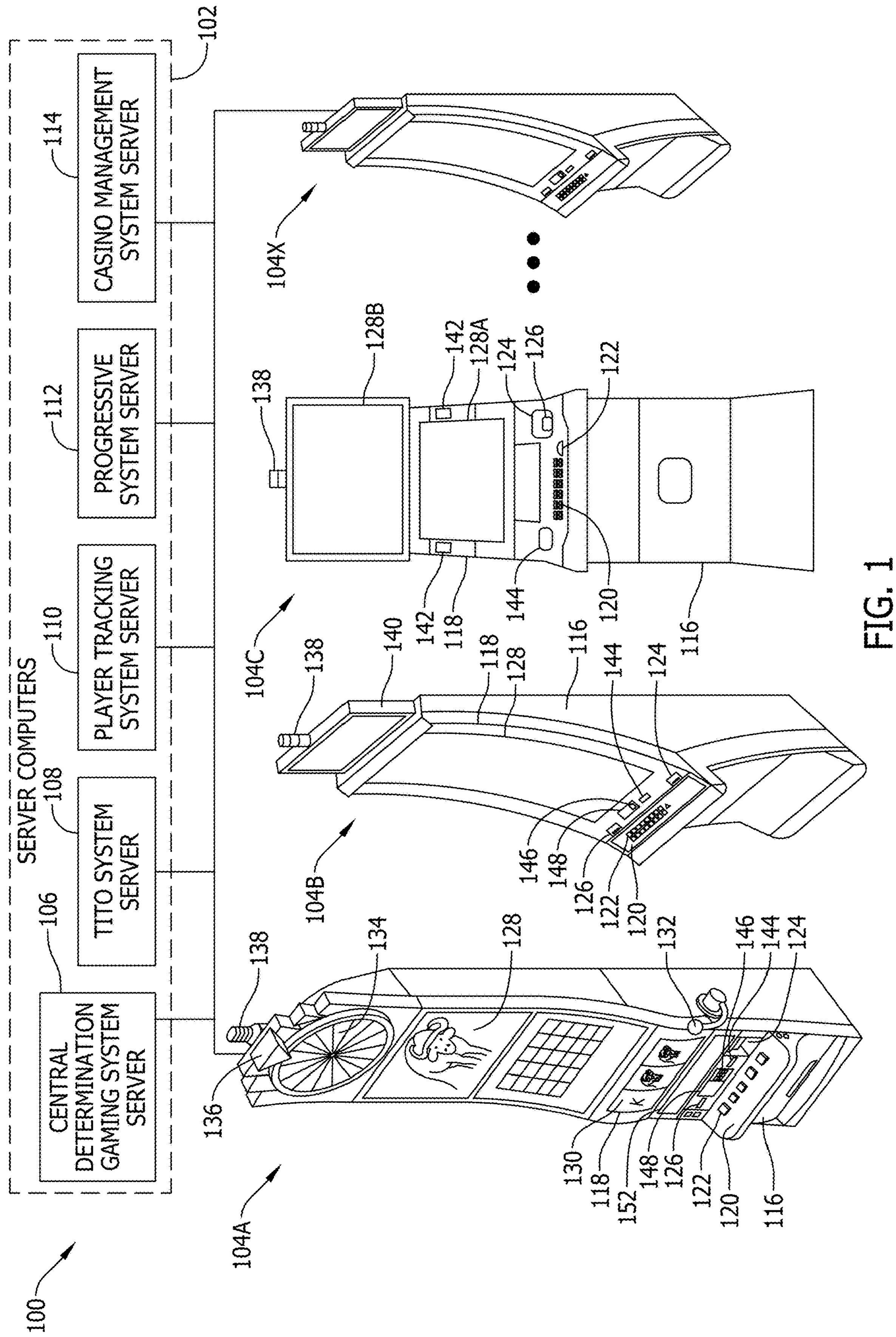
FIG. 1 is an exemplary diagram showing several EGMs networked with various gaming related servers.

The present application is directed to electronic gaming, and more specifically, to computer based electronic gaming systems and methods that include a gaming computing device having a processor programmed to cause the display of a wheel-based feature game that includes pick feature enhancements. More specifically, the at least one processor is programmed to display symbols on a set of reels that are positioned next to one another to form a symbol matrix. In some cases, the symbols that may be displayed include certain letters. In some other cases, the letters may spell out a word when they appear in each column of the matrix. For example, the letters "WHEEL" may appear with each letter in each column of the five columns of the matrix. When the word "WHEEL" is spelled out, this may trigger a feature game. The feature game may include a pick feature that includes a set of playing cards being displayed that are user selectable. When the user or player selects one of the cards, a prize may be displayed to be awarded to the user or player. The feature game may also include a wheel feature that includes a prize wheel being displayed that can be spun to award one or more prizes to the user or player. In some cases, the prize awarded from selecting one of the cards may enhance the prize wheel to improve the prizes available to be awarded from a spin of the wheel. In some other cases, the prize awarded from selecting one of the cards may be a credit prize. In still other cases, the prize awarded from selecting one of the cards may be a spin of the prize wheel.

As described above, the gaming system described herein includes a display device that is configured to display a base game that includes a plurality of symbols on a plurality of reels that are configured to spin (e.g., mechanically or virtually). The plurality of symbols includes a variety of different symbols including some letter symbols, some of which may spell the word "WHEEL" when they are positioned across the plurality of reels of the reel matrix, with each letter of the word "WHEEL" being associated with one reel of the plurality of reels. The feature game may then be triggered and may be caused to be displayed in response to the letter symbols spelling "WHEEL" in a horizontal line across the plurality of reels.

As part of the feature game, the gaming device may cause to be displayed a feature wheel and a plurality of pick icons (e.g., playing cards) on the display device. The feature wheel includes a plurality of wheel segments (e.g., wheel "slices") and a pointer to identify the wheel segment that is selected of the plurality of wheel segments after a wheel spin is initiated, thereby "selecting" the wheel segment from which to award a player. Prior to the player spinning the wheel, the player may select one or more of the plurality of pick icons to reveal a credit value, a wheel spin enhancement, and/or a wheel spin trigger. The wheel spin may be enhanced by adding one or more of an extra pointer to increase the number of wheel segments selected as a result of the wheel spin. The wheel spin may also be enhanced by increasing (e.g., "boosting") the prizes di splayed by each of the plurality of wheel segments to increase the prize to be awarded as a result of the wheel spin. One or more of the plurality of pick icons may be selected by the player prior to revealing the wheel spin trigger that initiates a wheel spin and ends the feature game. Although the word "WHEEL" spelled out across the reels is used to trigger the feature game in the example embodiment, other triggers may be used. For example, a different word may be spelled out across the reels, a combination of trigger symbols may be displayed, or a single trigger symbol may be displayed to trigger the feature game.

Certain technical problems arise when implementing an electronic game that includes a wheel feature and a pick feature. For example, certain gaming devices that execute games with only one of a wheel feature and/or a pick feature may provide inconsistent awards and/or communicate a negative impact on award probability. Additionally, certain gaming devices that execute games with only one of a wheel feature and/or a pick feature may prevent a user or player from fully understanding the desired game outcome of the game due to the lack of connection between the wheel feature and the pick feature. Further, a gaming device that includes both a wheel feature and a pick feature still needs to include proper control functions to implement the operation/capability while complying with gaming regulations, such as achieving a designated game RTP.

Embodiments of the present disclosure represent a technical improvement in the field of electronic gaming. Technical improvements represented by the present disclosure include at least: (i) a gaming device programmed to generate and cause the display of an electronic game that includes combining a prize wheel with a set of user selectable icons that may reveal varying combinations of enhancements to be applied to the prize wheel; (ii) a gaming device programmed to generate and cause the display of an electronic game that includes combining a prize wheel with a set of user selectable icons that may reveal an enhancement to be applied to the prize wheel in the form of an additional prize wheel pointer; (iii) a gaming device programmed to generate and cause the display of an electronic game that includes combining consistent prizes as revealed by a set of user selectable icons with inconsistent prizes as may be available to be awarded from a spin of mechanical or virtual reels; and (iv) a gaming device programmed to generate and cause the display of an electronic game that includes combining immediate prizes as revealed by a set of user selectable icons with inconsistent, incremental, and/or unknown prizes as may be available to be awarded from a spin of mechanical or virtual reels.

The systems and methods described herein may be used in bingo based (such as Class II) games, RNG based (such as Class III) games, and/or other games. For example, the feature of displaying a wheel-based feature game including pick feature enhancements may be used in Class II (e.g., bingo) games and/or Class III games, as described elsewhere herein. For example, Class II games may include pull-tab games, lotteries, punch boards, tip jars, and instant bingo, among others. In some bingo-based wagering games, a game system generates a bingo card at random and evaluates the bingo card against a randomly drawn ball call. The evaluation determines whether the player wins and, if so, determines a payout. Class III games typically include a random number generator (RNG) that can generate its own game results. Class III games include traditional non-bingo-based casino games, such as, for example, slot machines, black jack, roulette, and craps, among others.

For example, a game outcome of a Class II (e.g., bingo) game that displays a wheel-based feature game including pick feature enhancements may be determined by comparing one or more patterns of marked (and/or "daubed") cells of a bingo card with a pay-table of winning bingo patterns. If the bingo card does not include a pattern that matches a pattern in the pay-table of winning patterns, then a losing bingo outcome is determined, and a facade (e.g., reel spin outcome) may be displayed to the player showing no award provided to the player. If the bingo card does include a pattern that matches a pattern in the pay-table of winning patterns, then a winning bingo outcome is determined, and a facade (e.g., reel spin outcome) may be displayed to the player showing a reward provided to the player.

Different winning patterns may be associated with different awards. The award for a winning bingo outcome may be based on an amount wagered, an associated bingo pay-table, an associated set of rules for the bingo card, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when the bingo card is evaluated against the pay-table of winning patterns. In some examples, the player may be awarded for only the highest priority pattern (e.g., the highest paying winning pattern) that is matched. Other methods of play of a Class II bingo game are also envisioned and are within the scope of this disclosure. In some cases, the façade that is displayed may include an award from the base game and an additional award from the bonus or wheel game.

In another example, a game outcome of a Class III game that displays a wheel-based feature game including pick feature enhancements may be determined by comparing one or more patterns of symbols arrayed in a matrix on a plurality of reels with a pay-table of winning pay-lines through the matrix. If the matrix of symbols does not include a pattern that matches a winning pay-line in the pay-table of winning patterns, then a losing outcome is determined, and no award may be provided to the player. If the matrix of symbols does include a pattern that matches a winning pay-line in the pay-table of winning patterns, then a winning outcome is determined, and an award may be provided to the player. A random number generator (RNG) may randomly determine the outcome of each game.

Different winning patterns may be associated with different awards. The award for a winning outcome may be based on an amount wagered, an associated pay-table, a probability (and/or likelihood) of achieving a particular pattern, and/or other considerations. In some examples, the player/player account may be awarded for multiple patterns (e.g., all winning pay-lines) that are matched when the matrix of symbols is evaluated against the pay-table of winning patterns. In some examples, the player may be awarded for only the highest priority pattern (e.g., the highest paying winning pattern) that is matched. Other methods of play of a Class III game are also envisioned and are within the scope of this disclosure.

As used herein, the term "base game" may refer to games initiated in response to one of a plurality of game initiation events, such as a wager or credit being received by or transferred to an EGM, as described herein. A base game may be associated with a base game outcome represented by a plurality of base game symbols or base game reels, each of which may include a plurality of base game symbols, and each of which may be selected based on an evaluation of a bingo card and ball call (e.g., in Class II games) or upon a random number generated by a random number generator (e.g., in Class III games).

Further, as used herein, the term "feature game" may refer generally to a game or a component of a game involving procedures in addition to the base game. In some embodiments, a feature game may be triggered from a base game and may be associated with a feature game outcome, which may be different from the base game outcome. For example, a feature game may be initiated after, or during, a base game and in response to the occurrence of a particular condition, such as a "trigger condition" occurring during the base game. A feature game may result in a feature game outcome or feature award that increases a base game award or adds a feature game award to a base game award.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
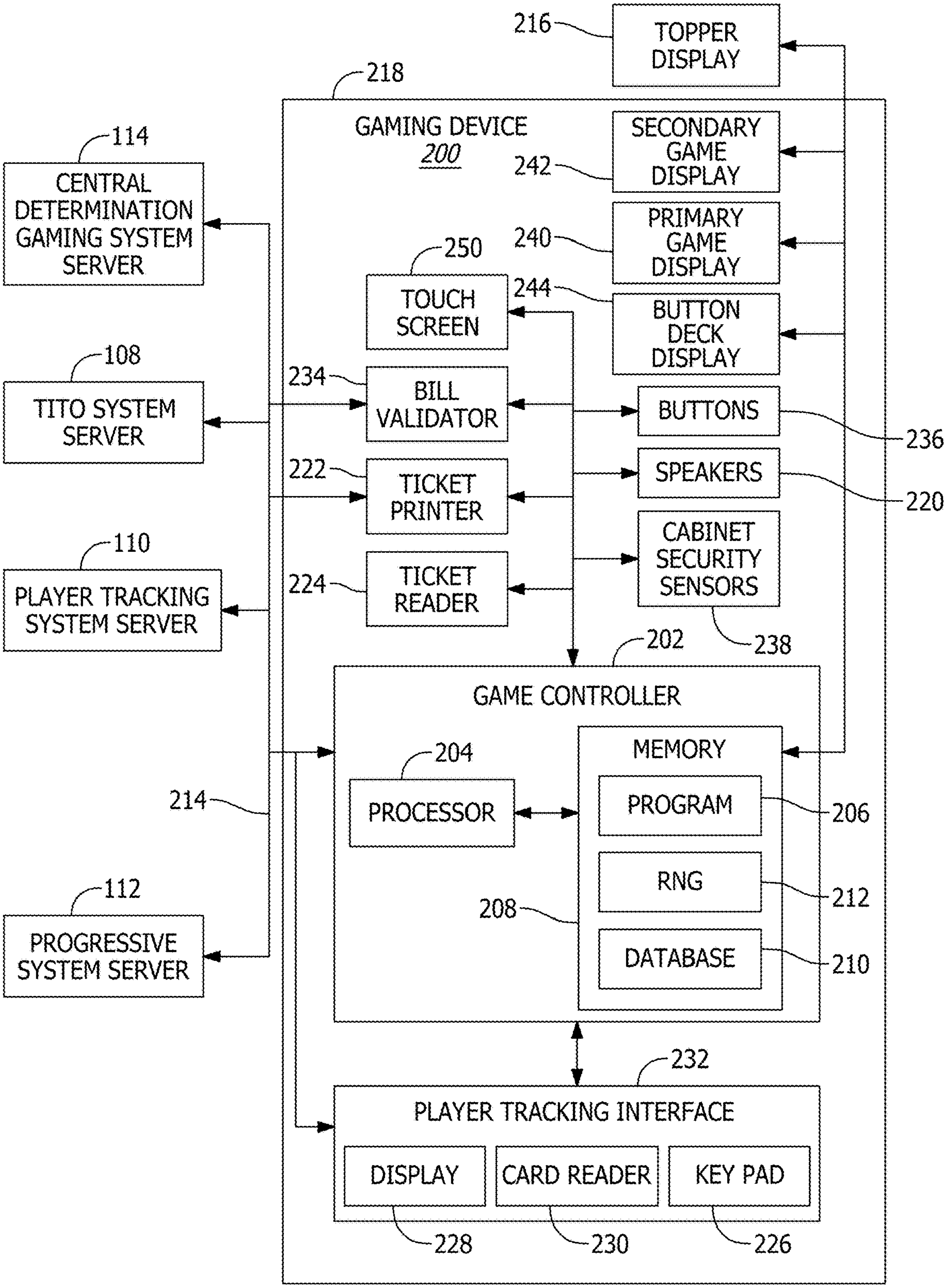
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
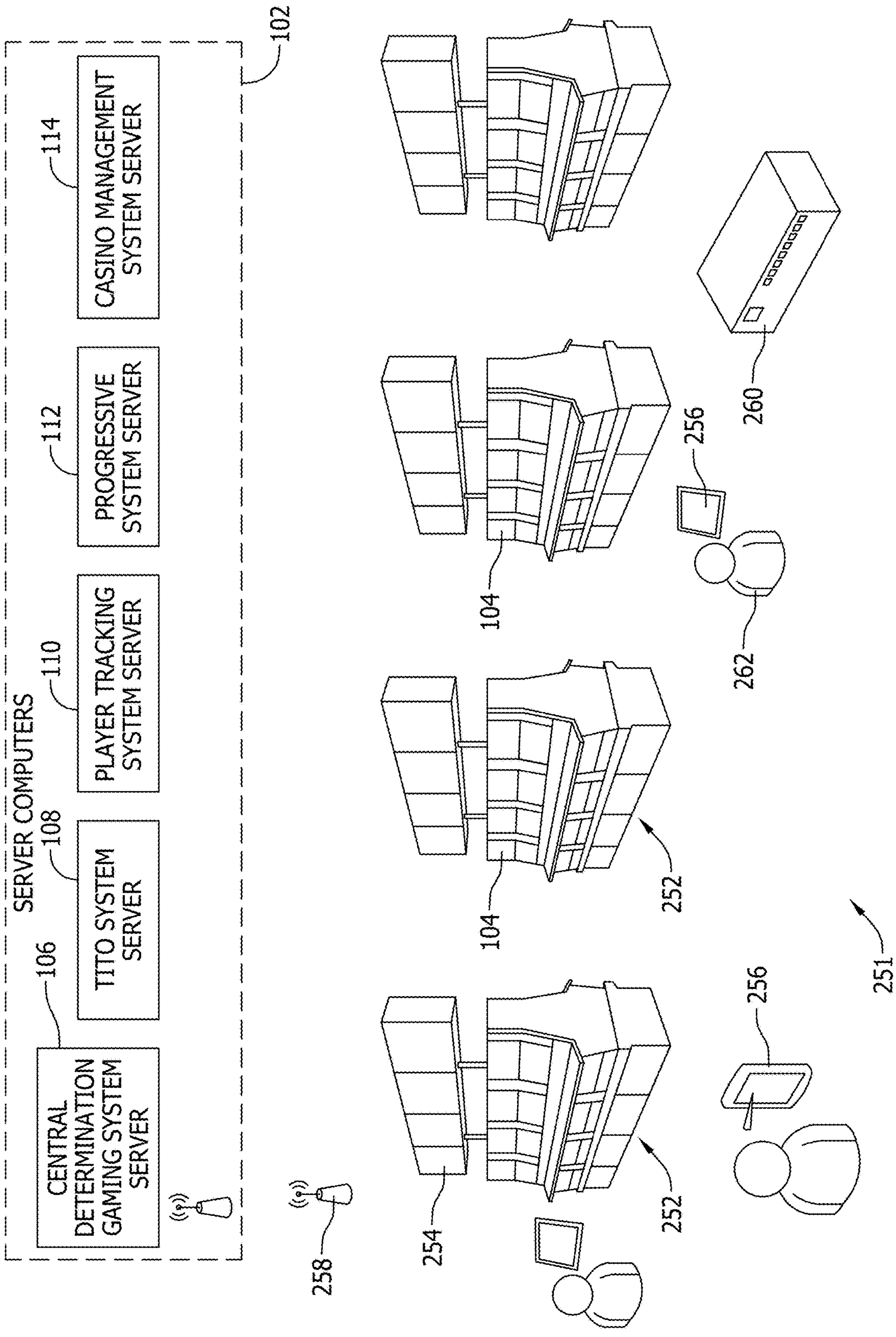
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
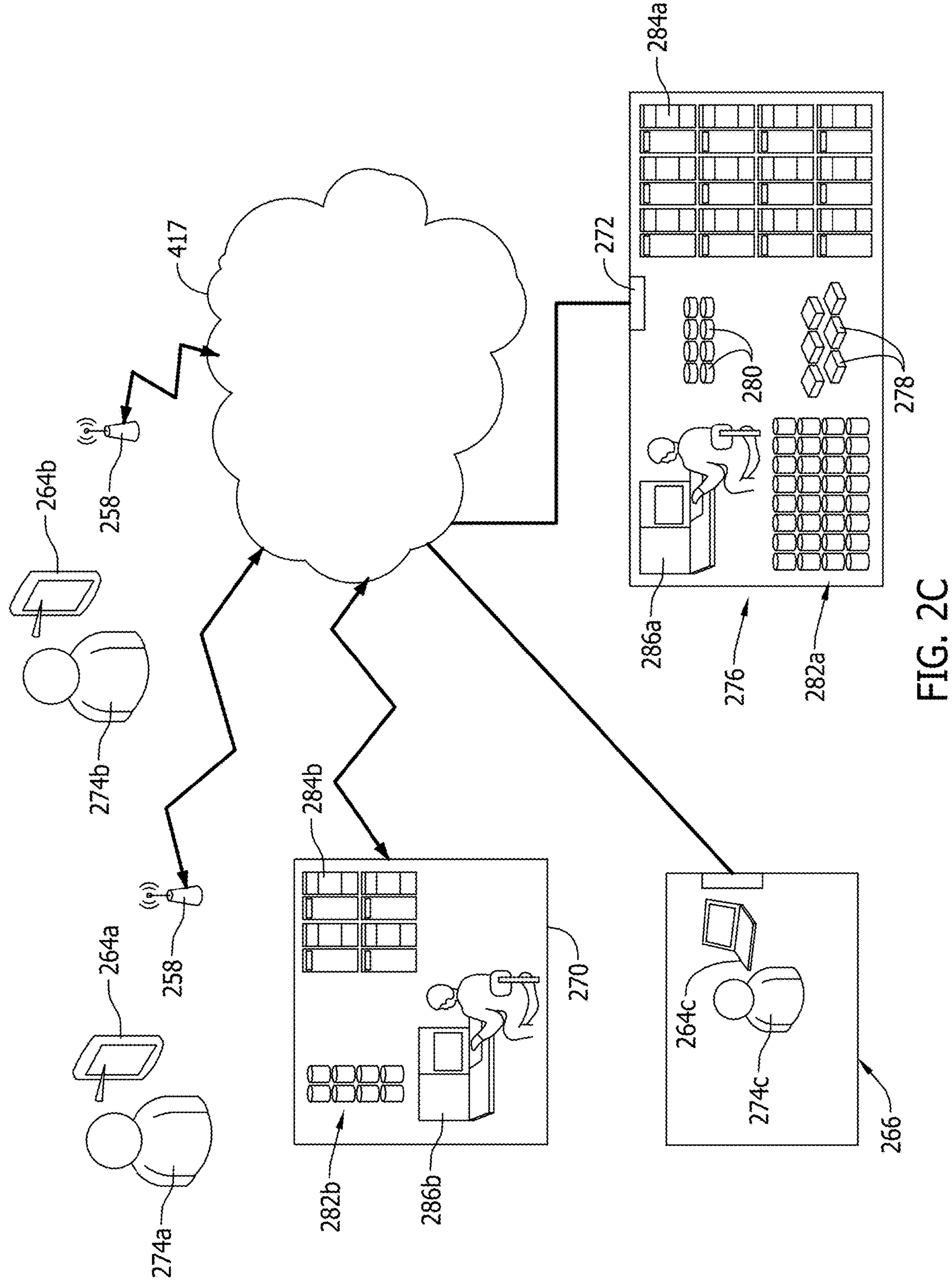
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
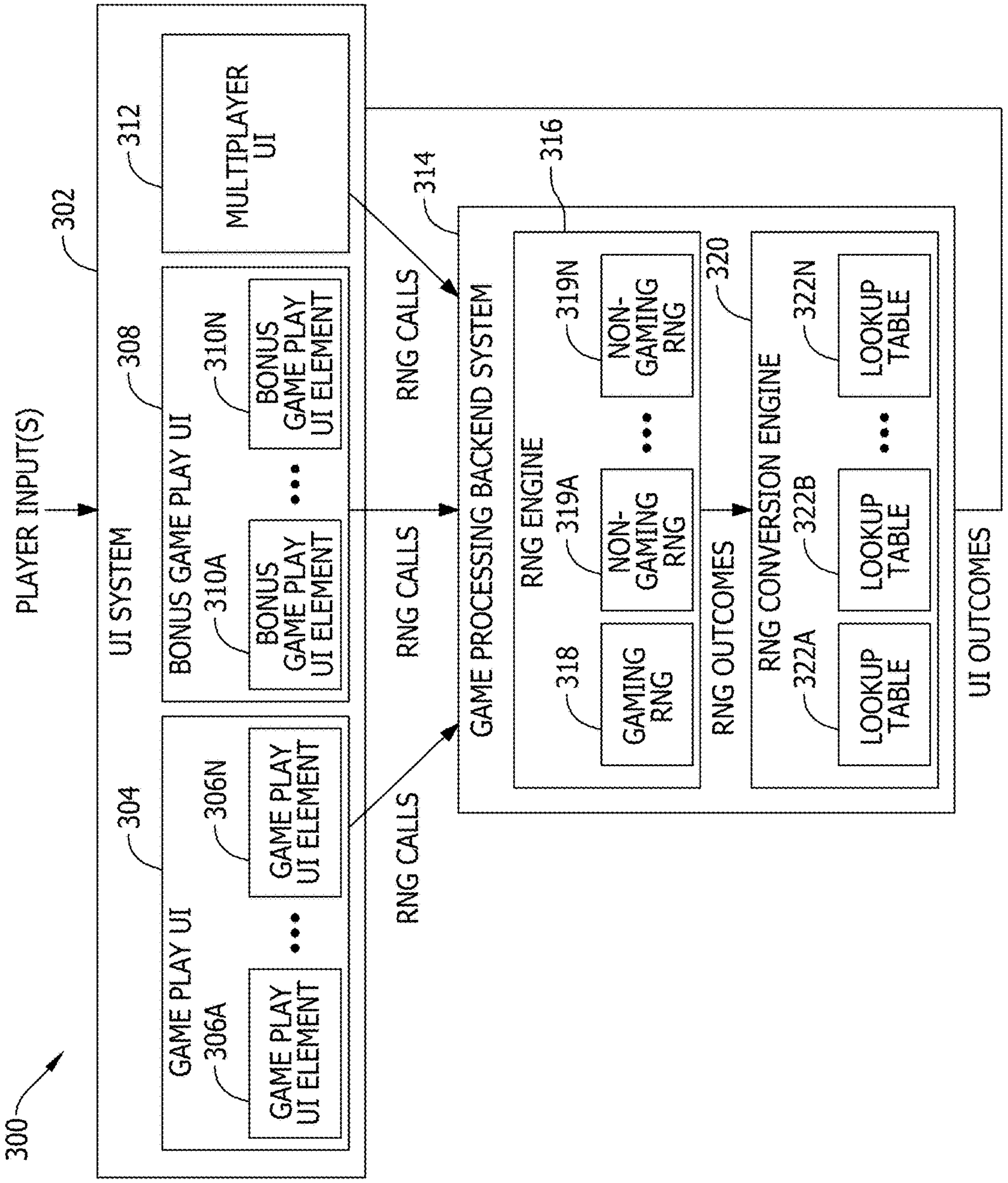
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
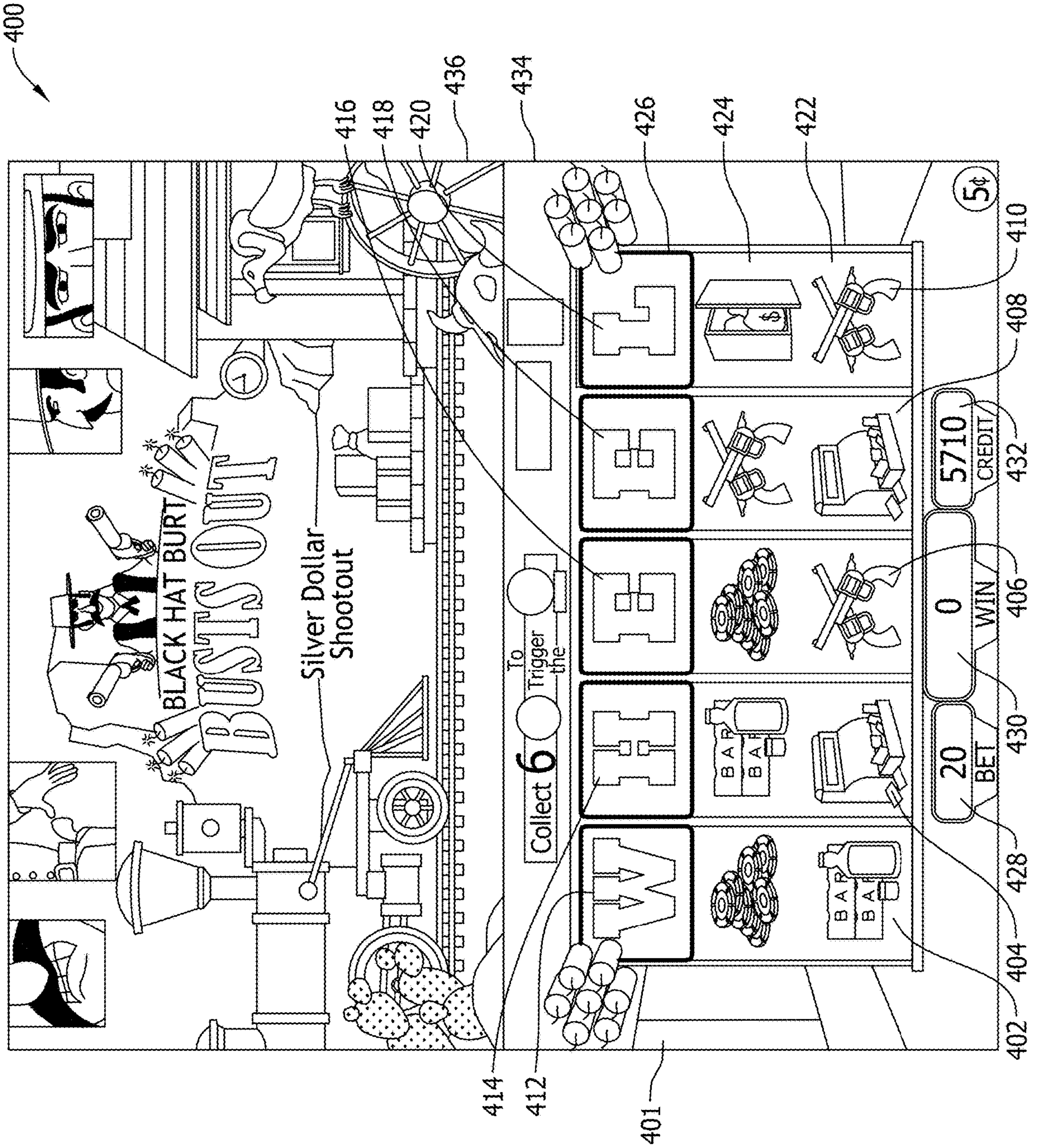
FIG. 4 is an example user interface or screenshot of a base game of an exemplary electronic game in accordance with the present disclosure.

FIG. 4 is an example user interface or screenshot 400 of a base game of an exemplary electronic game in accordance with the present disclosure. In the example of FIG. 4, a plurality of reels 402-410 are caused to be displayed in a primary game display area 401 of a gaming device (e.g., gaming devices 104A-104X) by a game controller (e.g., game controller 202). While five reels 402-410 are shown in the example of FIG. 4, in some examples, more or fewer reels may be used. In some examples, reels 402-410 may be implemented as mechanical reels or may include virtual reels that are computer generated and displayed on a computer display screen/display device. As shown, each reel of reels 402-410 includes a plurality of symbol display positions for presenting symbols (and/or symbol combinations) which may be associated with winning and/or losing reel game outcomes and/or awards.

In operation, game controller 202 (shown in FIG. 2A) may cause to be displayed a plurality of symbols on reels 402-410. The plurality of symbols may include a plurality of letter symbols 412-420 that spell "WHEEL" across reels 402-410. The letter symbols 412-420 may include a "W" symbol 412, an "H" symbol 414, a first "E" symbol 416, a second "E" symbol 418, and an "L" symbol 420. Each letter symbol of letter symbols 412-420 may be associated with one reel of reels 402-410. For example, "W" symbol 412 may be associated with reel 402, "H" symbol 414 may be associated with reel 404, first "E" symbol 416 may be associated with reel 406, second "E" symbol 418 may be associated with reel 408, and "L" symbol may be associated with reel 420.

Reels 402-410 may include a plurality of rows 422-426. In response to the display of letter symbols 412-420 spelling "WHEEL" across reels 402-410 in a straight line along one row of rows 422-426, game controller 202 may cause to be displayed a feature game. In the example of FIG. 4, letter symbols 412-420 spell "WHEEL" along row 422 (e.g., feature game trigger word). In some examples, letter symbols 412-420 may spell "WHEEL" along rows 424 or 426. In other examples, letter symbols may spell an alternative word along one row of rows 424-426 in a straight line to trigger the feature game. In still other examples, letter symbols may spell "WHEEL" or an alternative word across reels 402-410 on multiple rows of rows 424-426, such as at a diagonal or alternating or staggered reel symbol positions. Reels 402-406 may be of a varying size and are not limited to three rows as shown in the Figures. Primary game display area 401 may also include a varying number of reels and is not limited to five reels as shown in the Figures. In other embodiments, a different set of symbols (e.g., feature game trigger symbols) displayed on the reels may cause game controller 202 to display the feature game, such as a different word spelled out across the reels (e.g., feature game trigger word), a different set of symbols, or a single trigger symbol.

Game controller 202 may cause to be displayed a bet meter 428, a win meter 430, and/or a credit meter 432 in primary game display area 401. Bet meter 428 may display a bet value for each spin of reels 402-410. Win meter 430 may display a win value to be awarded to a player from spins of reels 402-410. Credit meter 432 may display a total credit value attributed to the player. As shown in FIG. 4, primary game display area 401 may appear to be segmented into a bottom display area 434 and a top display area 436. Plurality of reels 402-410 may be displayed only on bottom display area 434.

Figure 5:
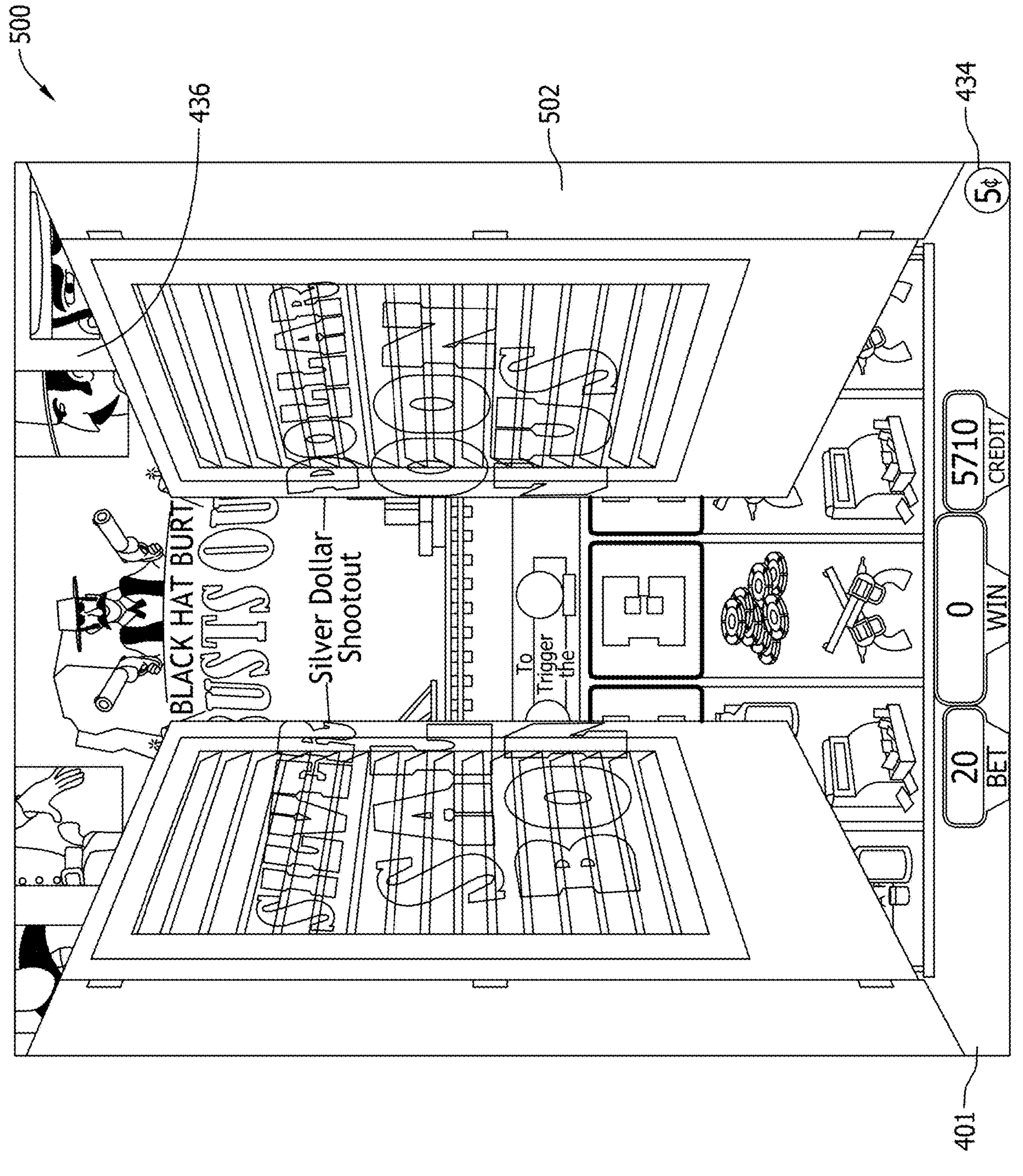
FIGS. 5-6 are example user interfaces or screenshots of the base game shown in FIG. 4
Figure 6:
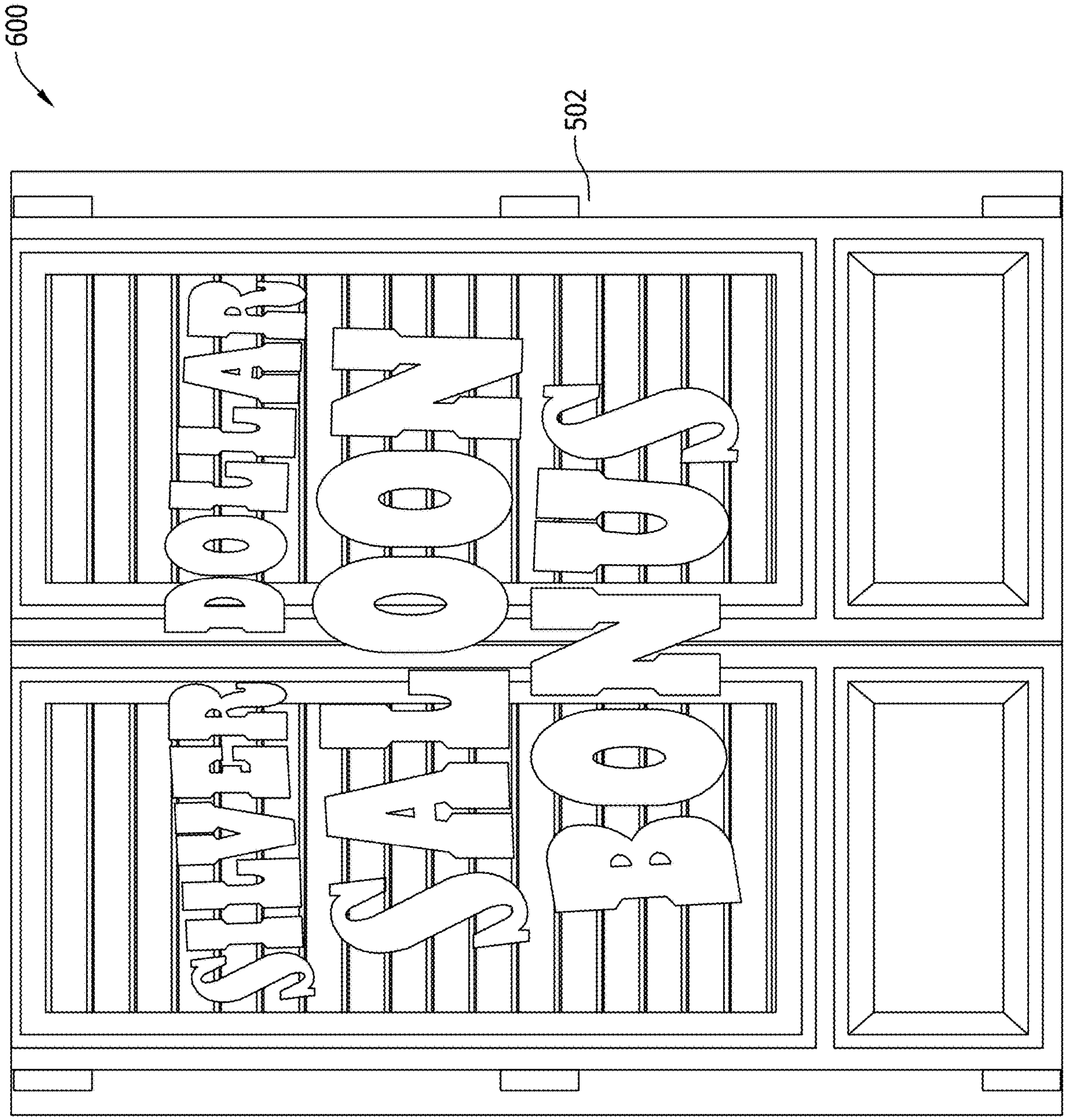
Figure 7:
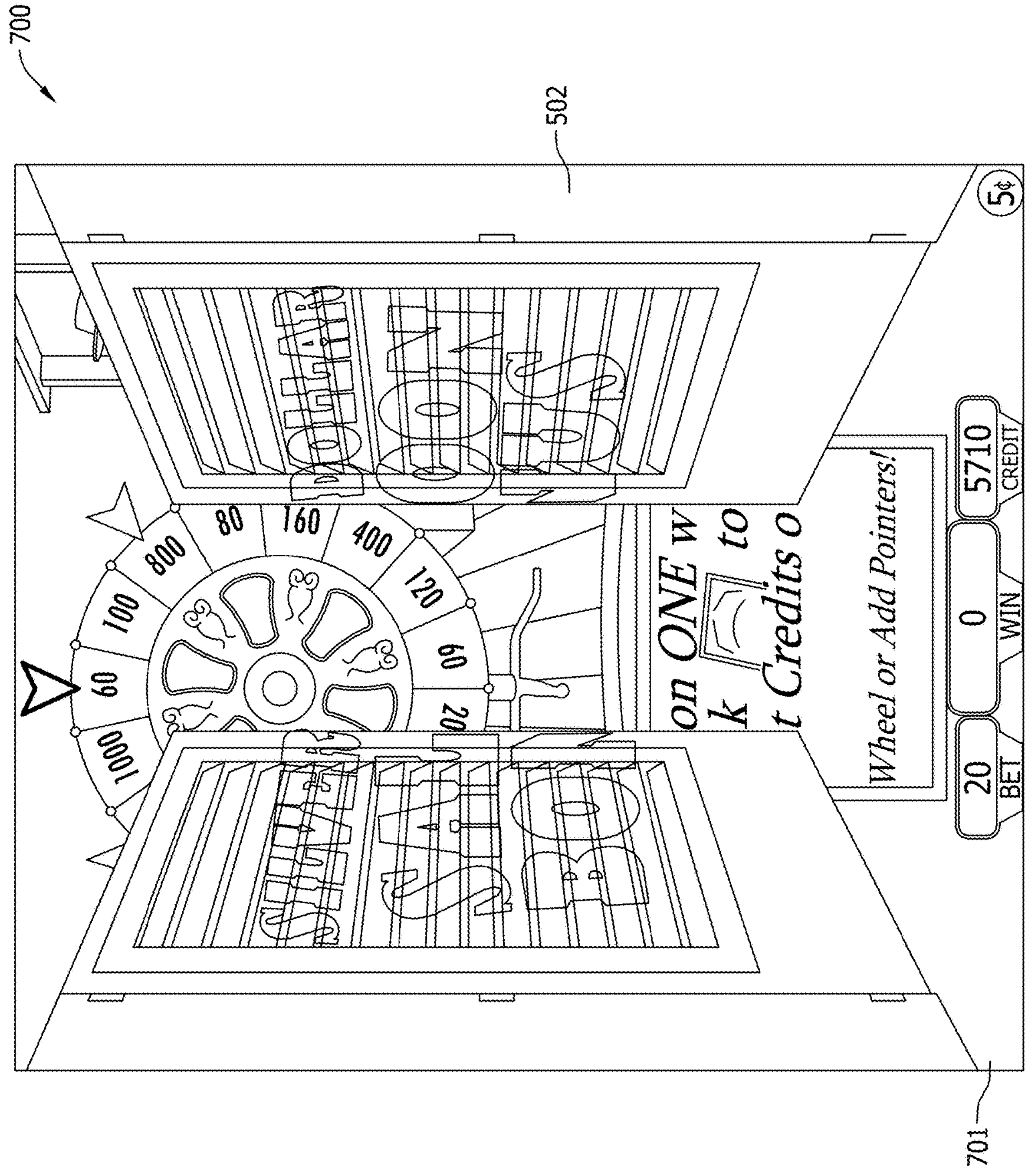
FIGS. 7-8 are example user interfaces or screenshots of a feature game of an exemplary electronic game in accordance with the present disclosure.

FIGS. 5-6 are example user interfaces or screenshots 500-600, respectively of the base game of the exemplary electronic game in accordance with the present disclosure. Prior to display of the feature game, game controller 202 (shown in FIG. 2A) may cause to be displayed a transition animation 502 to transition from the display of the base game in primary game display area 401 to the display of the feature game in a secondary game display area 701 (as shown in FIG. 7). Transition animation 502 may be displayed on both of bottom display area 434 and top display area 436, appearing to take up substantially all of primary game display area 401. In the examples of FIGS. 5-6, transition animation 502 is displayed to appear as a closing and opening of a set of double doors. The start of transition animation 502 may appear as a set of open doors that are closing over the base game as displayed in primary game display area 401, as shown in FIG. 5. Transition animation 502 may then progress to appear as a set of closed doors to communicate to a player a transition "away from" the base game, as shown in FIG. 6. In some example, transition animation 502 may have an alternative appearance, including for different game themes, and thus is not limited to the illustrated examples of FIGS. 5-6.

FIG. 7 is an example user interface or screenshot 700 of a feature game of an exemplary electronic game in accordance with the present disclosure. In the example of FIG. 7, transition animation 502 may continue to progress to appear as a set of open doors that are opening on the feature game displayed in secondary game display area 701 to communicate to the play a transition "into" the feature game from the base game. In some examples, transition animation 502 may have an alternative appearance, including for different game themes, and thus is not limited to the illustrated example of FIG. 7.

Figure 8:
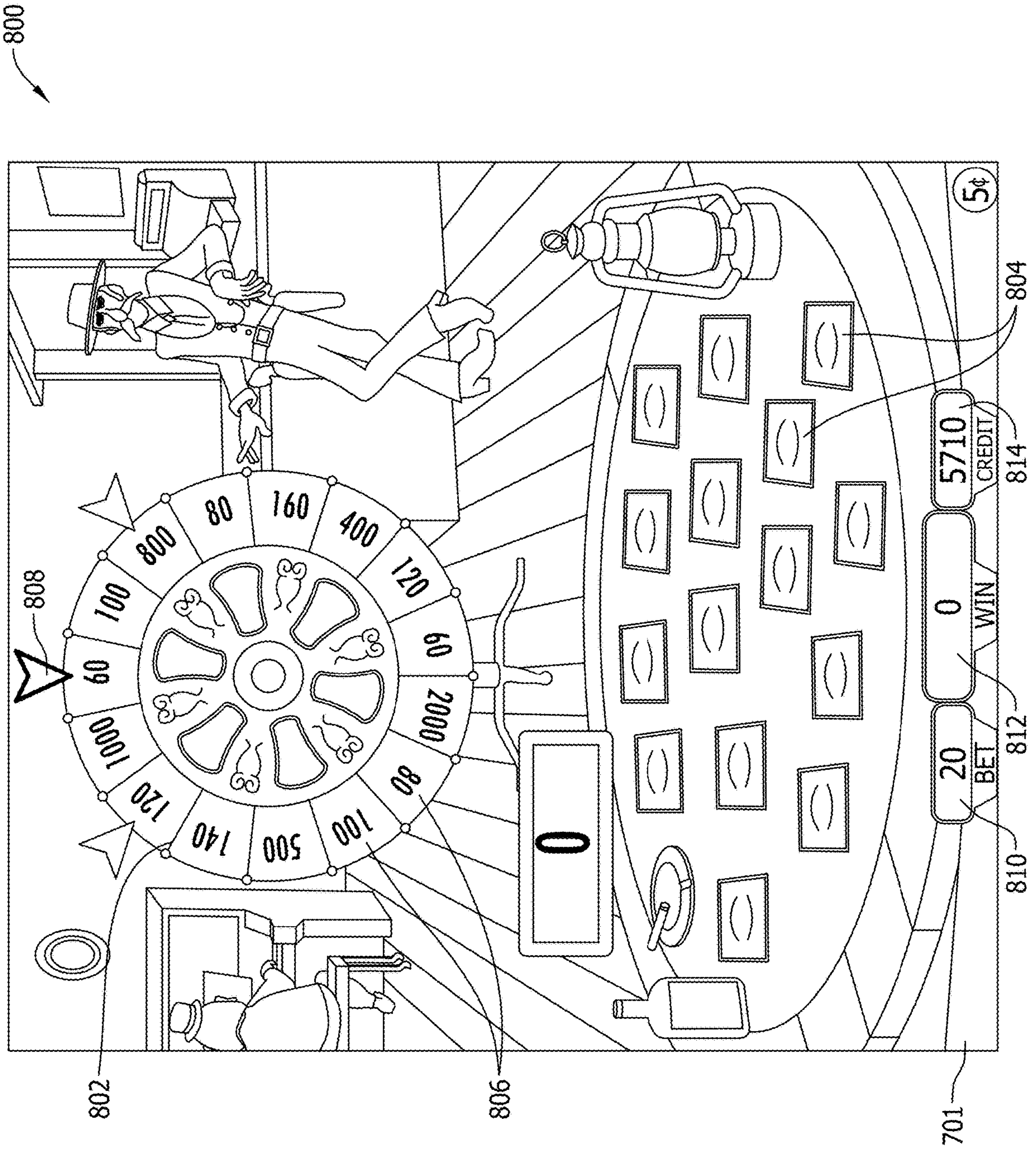

FIG. 8 is an example user interface or screenshot 800 of the feature game of the exemplary electronic game in accordance with the present disclosure. In the example of FIG. 8, a wheel 802 and a plurality of pick icons 804 are caused to be displayed in secondary game display area 701 of a gaming device (e.g., gaming devices 104A-104X) by a game controller (e.g., game controller 202). Game controller 202 (shown in FIG. 2A) may also cause to be displayed a bonus bet meter 810, a bonus win meter 812, and/or a bonus credit meter 814 in secondary game display area 701. In some examples, values displayed by bonus bet meter 810, bonus win meter 812, and bonus credit meter 814 may correspond to values displayed by bet meter 428, win meter 430, and credit meter 432, respectively, in primary game display area 401. In the example of FIG. 8, pick icons 804 appear as playing cards. In some examples, pick icons 804 may have an alternative appearance. Pick icons 804 may be available to be selected by a player until a spin of wheel 802 is revealed by a selected pick icon of pick icons 804.

Wheel 802 may include a plurality of wheel segments 806, each displaying a prize to be awarded to a player if a primary pointer 808 of wheel 802 lands (e.g., stops) on that wheel segment (e.g., wheel stop position) when wheel 802 stops spinning. Each wheel segment may display a prize of a credit value. In some examples, each wheel segment may display an alternative award, such as, but not limited to, a jackpot value or a symbol indicating a progressive prize towards a jackpot total. During the feature game, game controller 202 may cause to be allocated to a player any number of picks of pick icons 804 and any number of spins of wheel 802. For example, the player may be allocated one spin of wheel 802 and a number of picks of pick icons 804 until a spin of wheel 802 is revealed by a selected pick icon.

Figure 9:
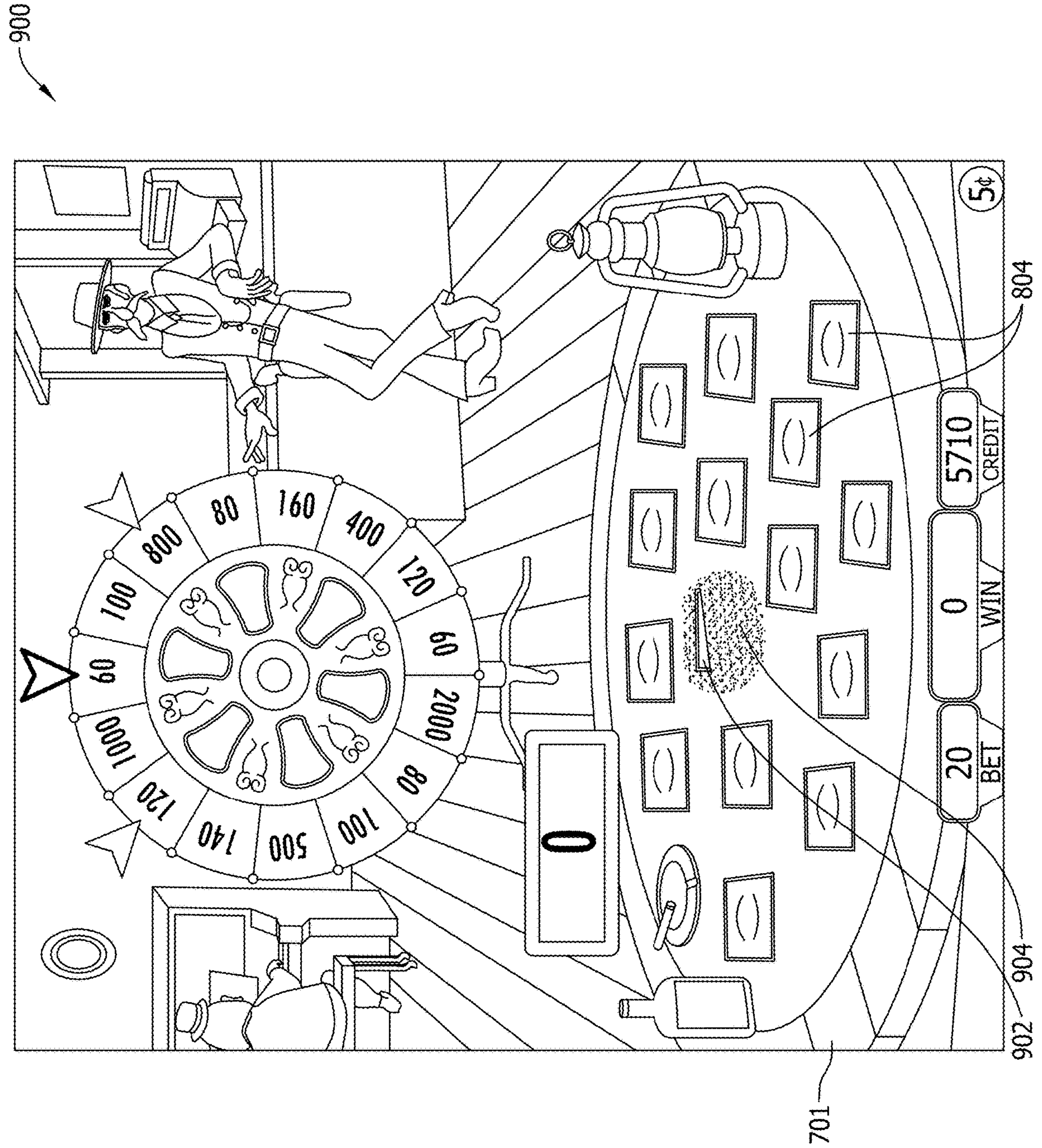
FIGS. 9-31 are example user interfaces or screenshots of the feature game shown in FIGS. 7-8.
Figure 10:
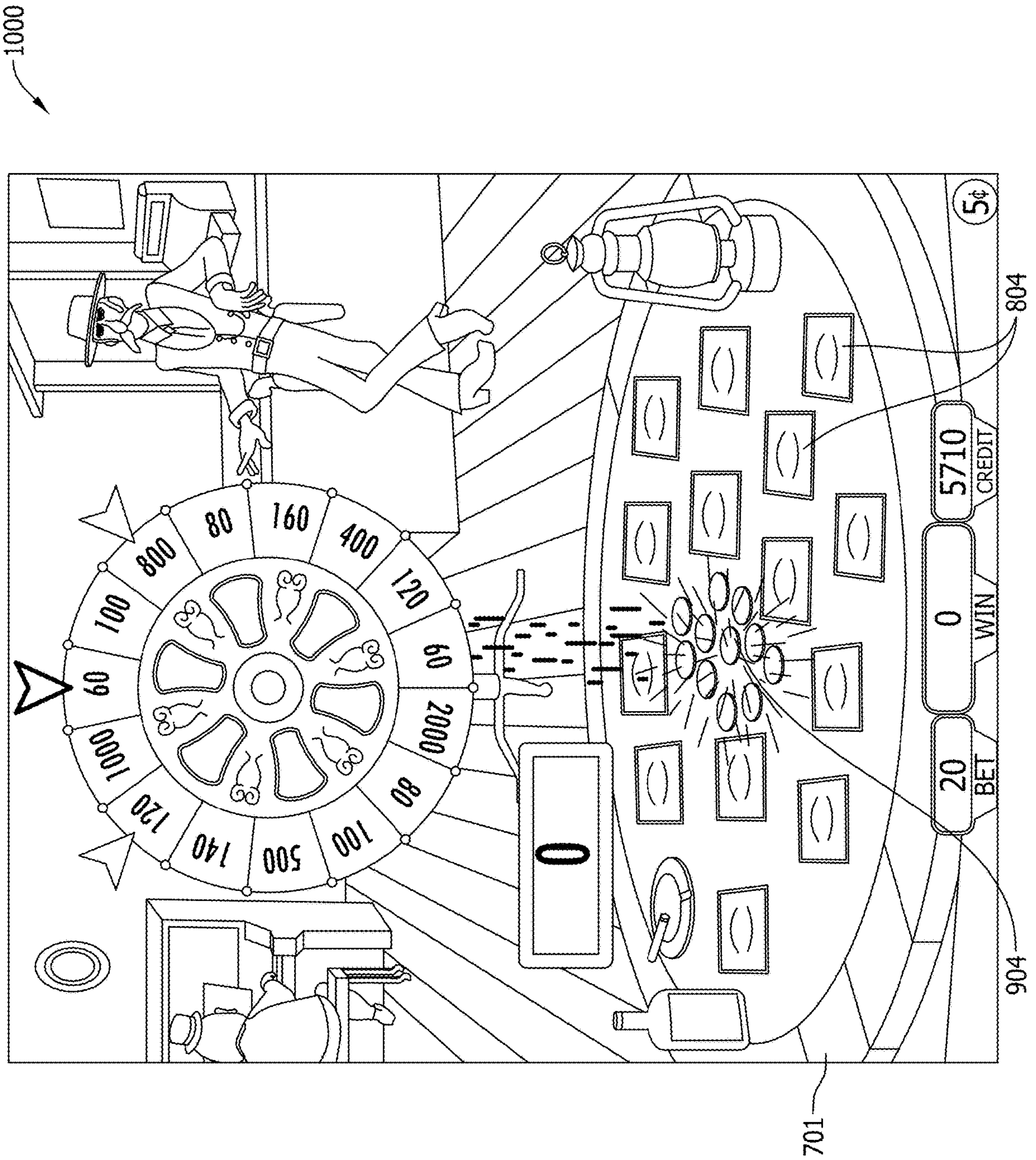

FIGS. 9-14 are example user interfaces or screenshots 900-1400, respectively, of the feature game of the exemplary electronic game in accordance with the present disclosure. A player selection of a pick icon of pick icons 804 may cause game controller 202 (shown in FIG. 2A) to display a transformation of the selected pick icon into an activated pick icon 902, which may include the display of a pick animation 904 over activated pick icon 902. As shown in FIGS. 9-10, pick animation 904 may appear as a growing circle of light over activated pick icon 902. Following pick animation 904, game controller 202 may cause to be displayed a prize as revealed by the selection of the pick icon (e.g., an output of a pick icon), which may include, but is not limited to, a credit value, an additional pointer for wheel 802 (e.g., additional wheel pointer), a boost of wheel 802 (e.g., wheel boost), a multiplier value, a multiple of a total win value, a jackpot value, a symbol indicating a progressive prize towards a jackpot total, and/or a spin of wheel 802. One or more of each of the prizes may be available to be revealed by a selection of a pick icon of the plurality of pick icons. Specifically, the one or more of each of the prize may include one or more of the wheel enhancements (e.g., wheel enhancement and/or additional wheel enhancement such as second wheel enhancement), such as additional pointer for wheel 802 and/or boost of wheel 802.

Prior to the display of a prize as revealed by a selected pick icon of pick icons 804, game controller 202 may cause the evaluation of one or more prize lookup tables (not shown in figures) saved in memory. The one or more prize lookup tables may include the plurality of prizes available from selecting one or more of pick icons 804. In some examples, the selection of the prize and/or the number of selected prizes from the prize lookup table may be random for a Class III (RNG based) game. For example, the reveal order of prizes from selecting multiple of pick icons 804 may be randomized, in that a prize is randomly selected from the prize lookup table to be revealed by the selection of any of pick icons 804. In other examples, the selection of the prize and/or the number of selected prizes from the prize lookup table may be predetermined. For example, a reveal order (e.g., output order) of prizes from selecting multiple of pick icons 804 may be predetermined, in that a specific prize is revealed regardless of the pick icon of pick icons 804 that is selected. In still other examples, the selection of the prize and/or the number of selected prizes from the prize lookup table may be subject to constraints as saved in memory. For example, the reveal order of prizes from selecting multiple of pick icons 804 may be based on a minimum and/or a maximum prize amount to be awarded during the feature game.

Figure 11:
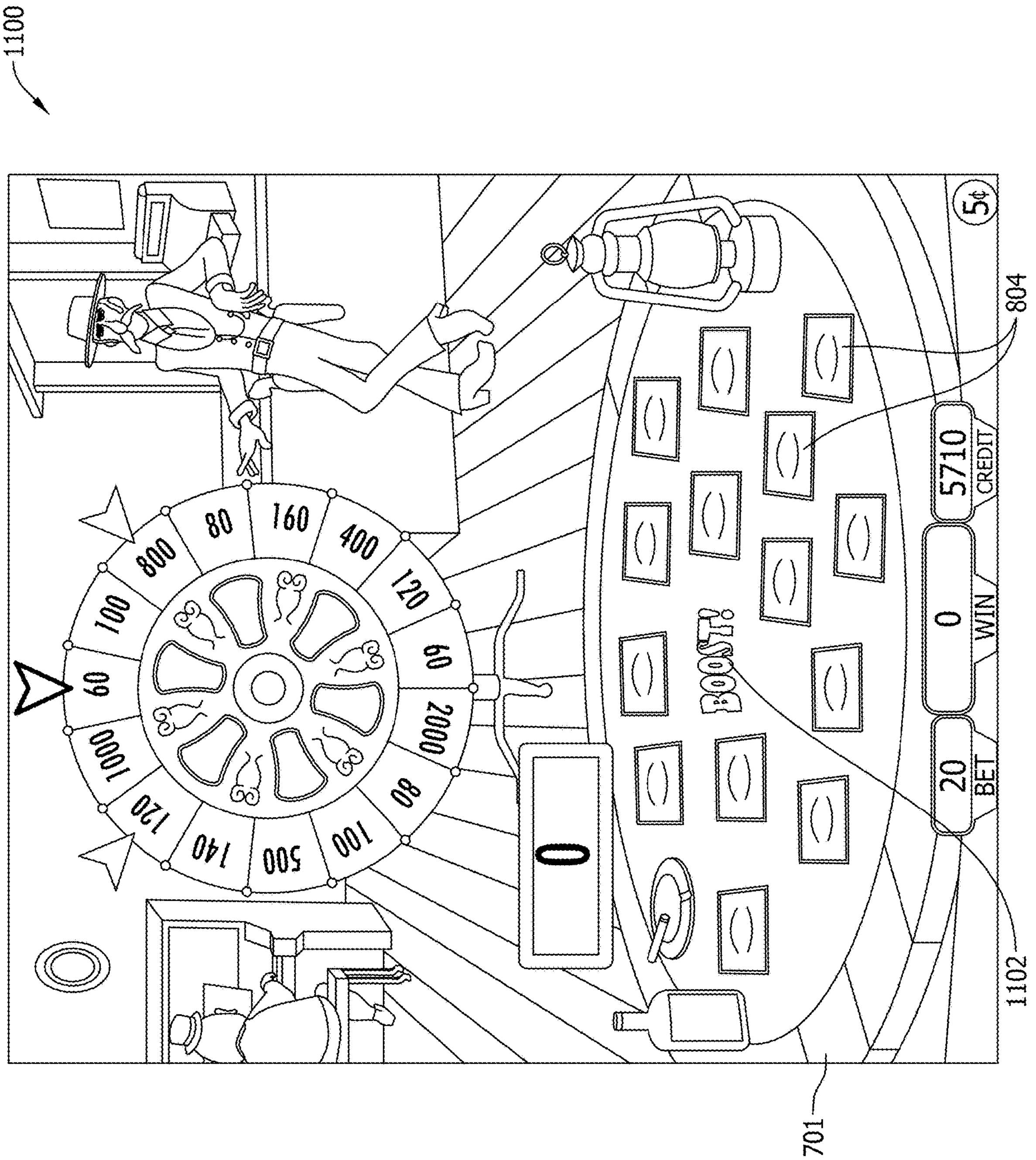

The prize as revealed by the selection of the pick icon may appear to replace activated pick icon 902 following pick animation 904. As shown in FIG. 11, game controller 202 may cause to be displayed a prize of a wheel boost 1102. In the example of FIG. 11, wheel boost 1102 appears as the word "BOOST!" In some examples, wheel boost 1102 may have an alternative appearance than as shown in FIG. 11.

Figure 12:
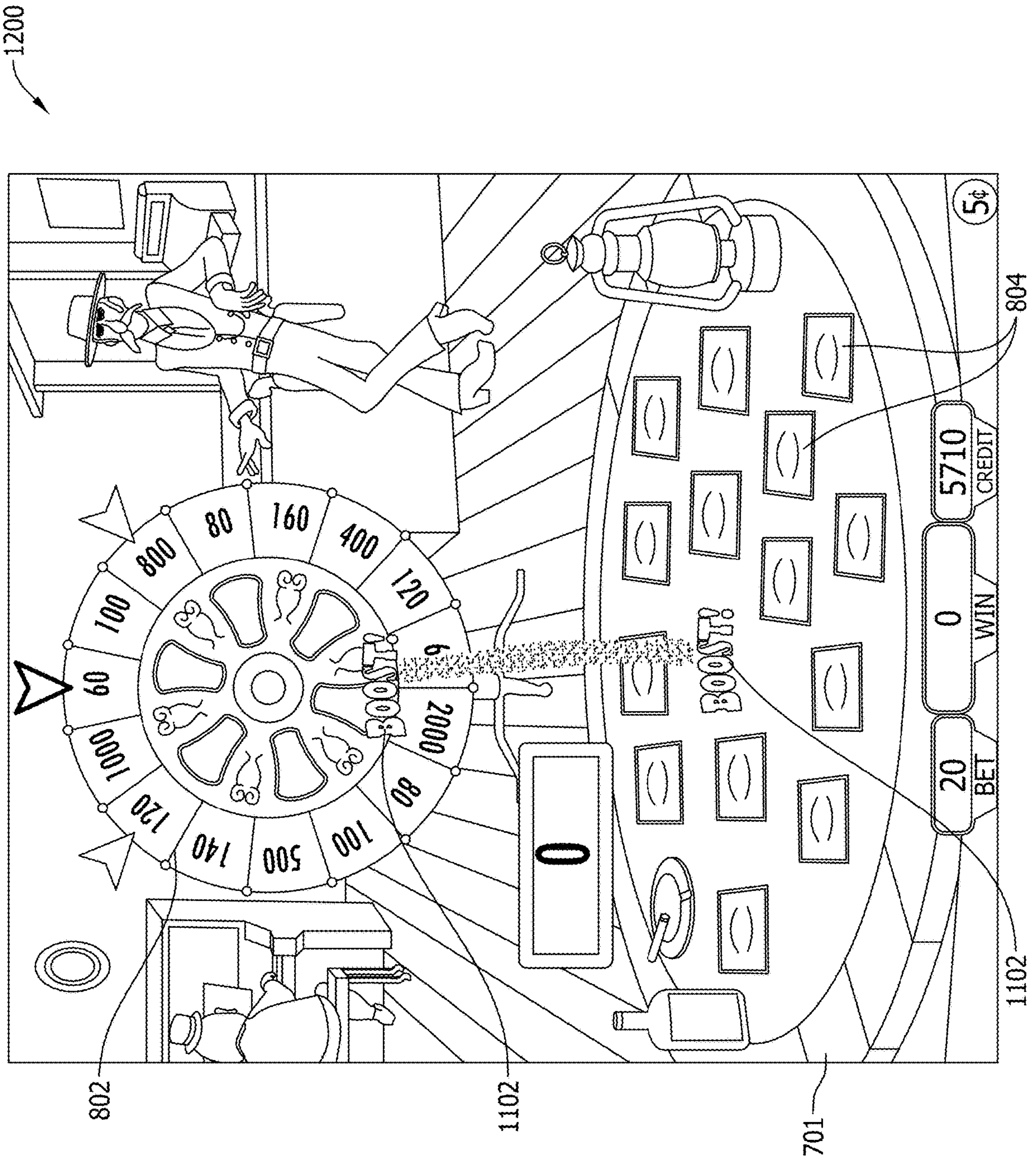
Figure 13:
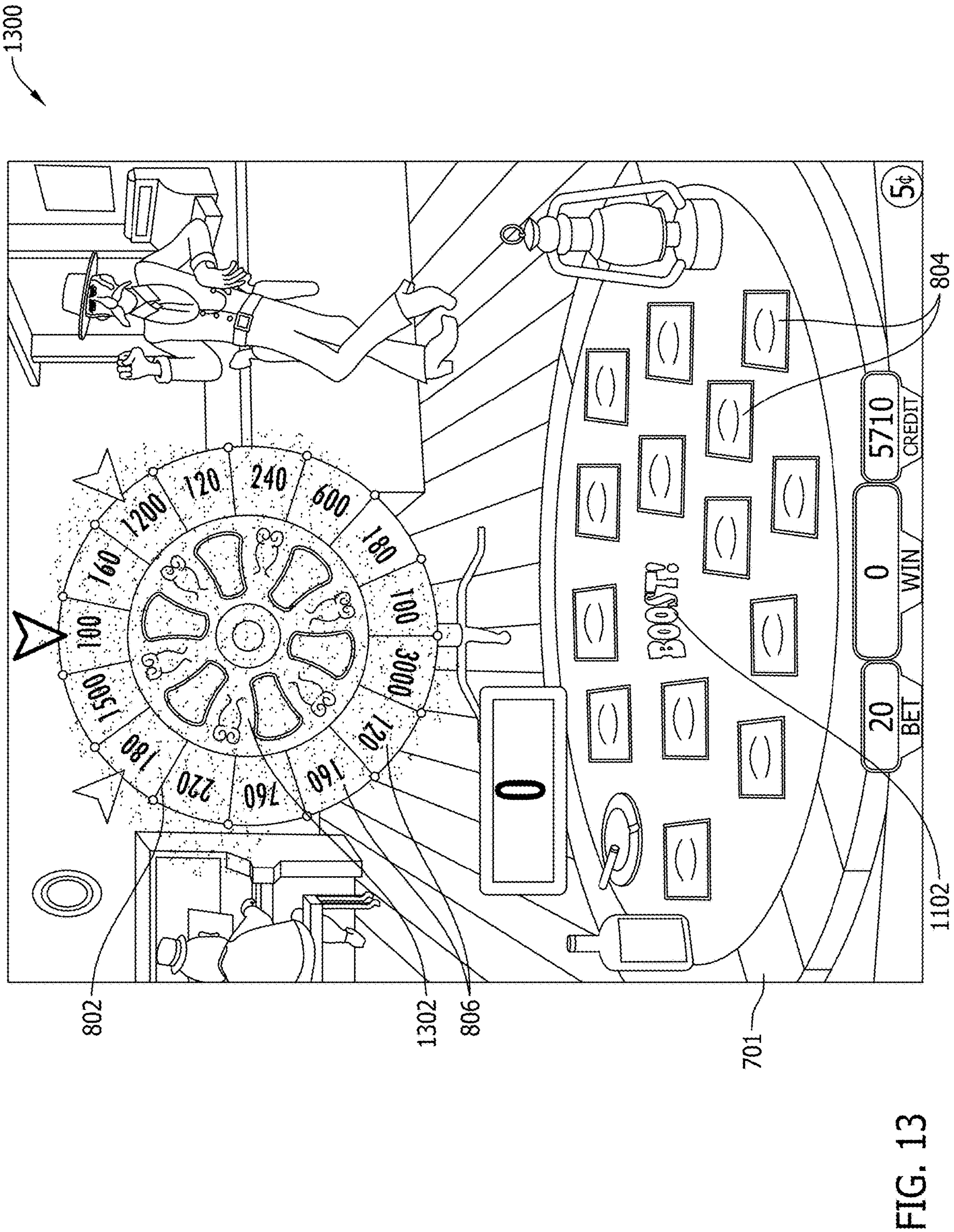
Figure 14:
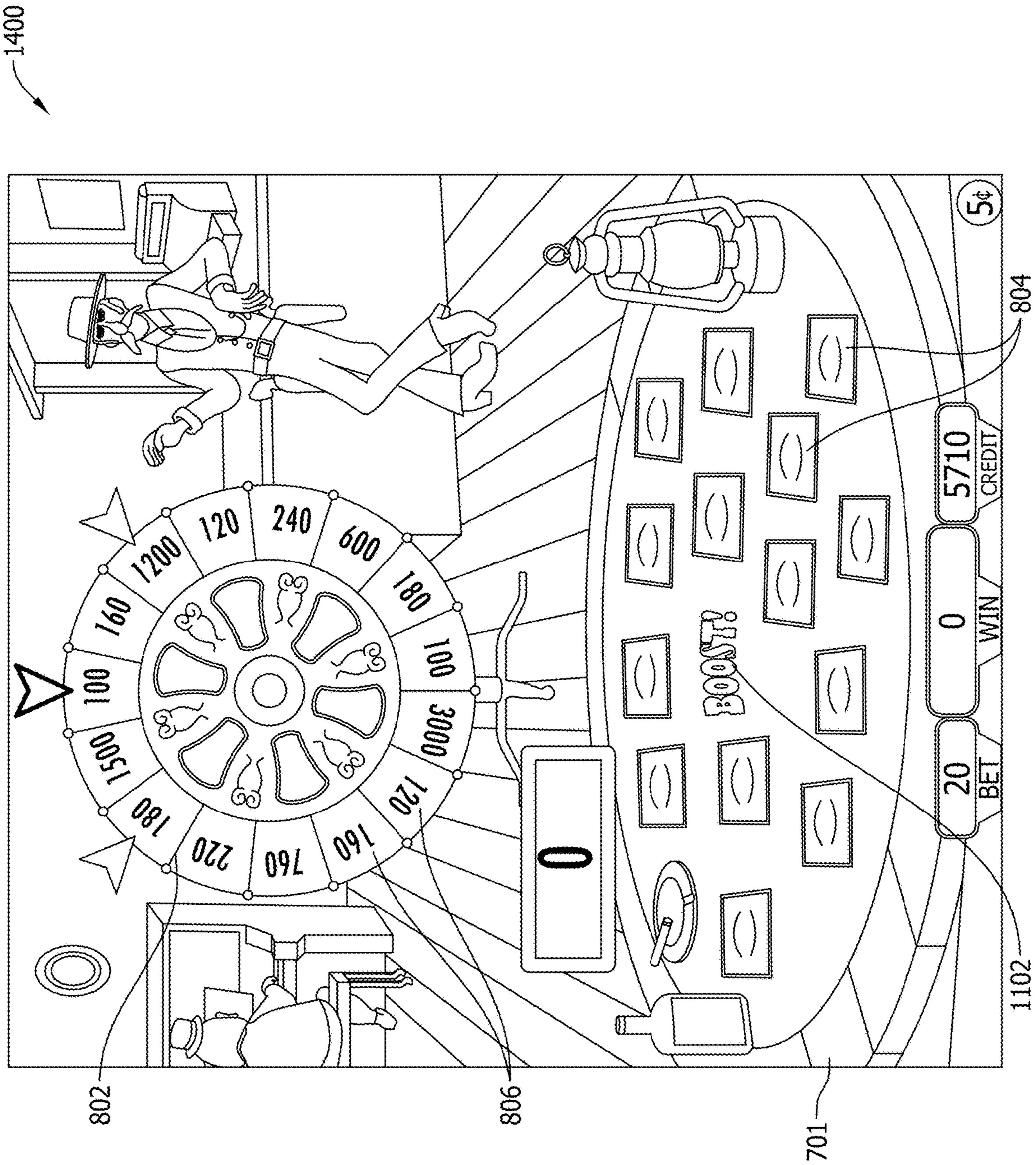

As shown in FIG. 12, game controller 202 may cause to be displayed an animation of a duplicate of wheel boost 1102 moving towards wheel 802 after wheel boost 1102 is revealed by a selected pick icon. The animation of the duplicate of wheel boost 1102 may progress until the duplicate of wheel boost 1102 is over wheel 802 to communicate to a player that the revealed prize of wheel boost 1102 will impact the wheel 802. Additionally, game controller 202 may cause to be displayed a wheel boost animation 1302 on wheel 802, as shown in FIG. 13. Wheel boost animation 1302 may appear as a growing burst of flame that engulfs wheel 802 and replaces the prizes displayed by each wheel segment of wheel segments 806. Thus, wheel boost animation 1302 communicates to the player the impending change of the prizes displayed by wheel segments 806 is due to the revealed pick icon prize of wheel boost 1102. Following wheel boost animation 1302, game controller 202 may cause to be displayed improved prizes for wheel segments 806. For example, game controller 202 may cause to be displayed increased credit values on wheel segments 806, such as shown by the change to the credit values on wheel 802 from FIG. 12 to FIG. 14. Additionally, following wheel boost animation 1302, wheel 802 may have a "brightened" appearance, such as from brighter colors defining wheel segments 806 (as shown in FIG. 14).

Figure 15:
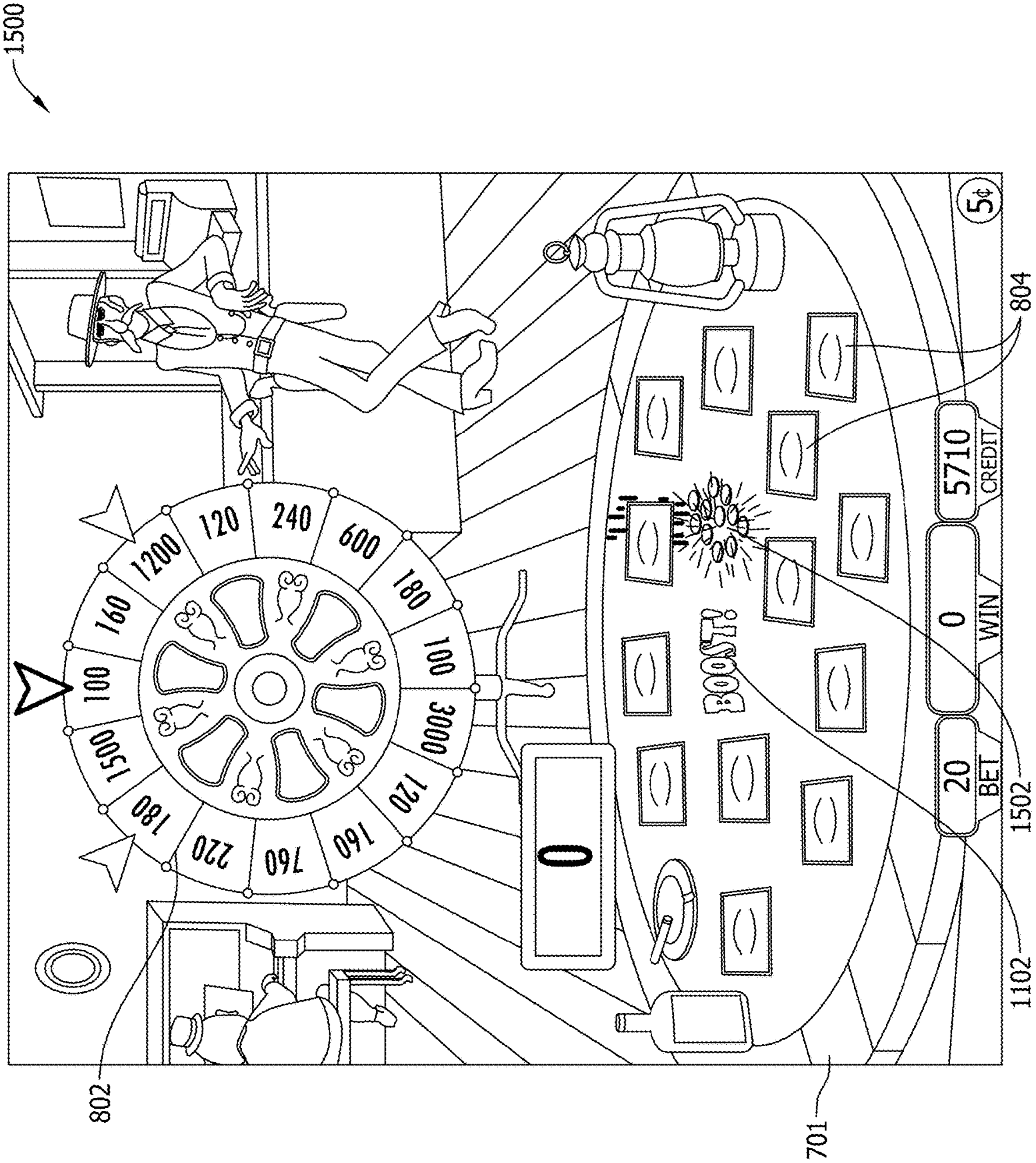
Figure 16:
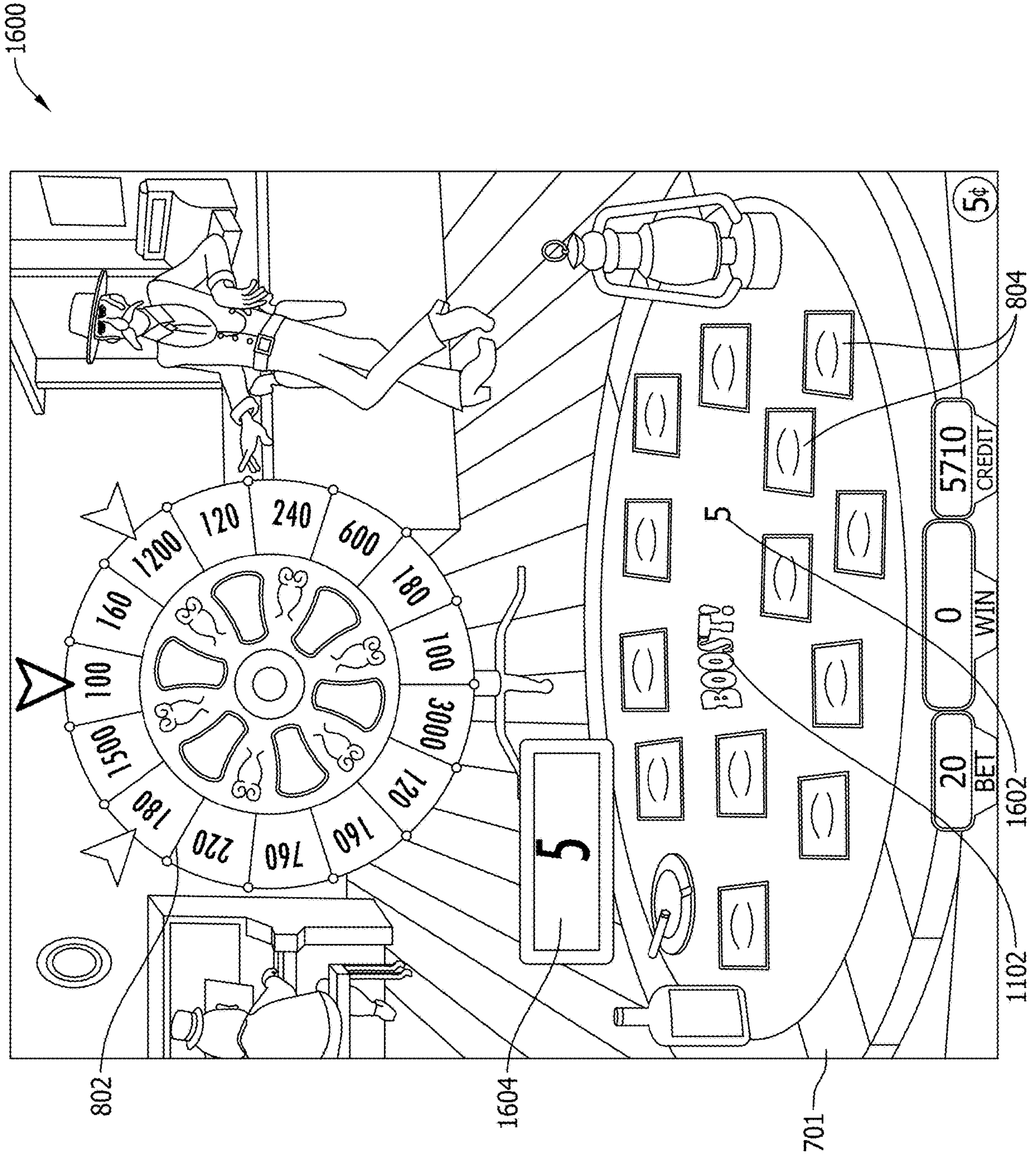

FIGS. 15-16 are example user interfaces or screenshots 1500-1600, respectively, of the feature game of the exemplary electronic game in accordance with the present disclosure. Game controller 202 (shown in FIG. 2A) may display a prize of a credit value 1602. Similar to wheel boost 1102, the display of credit value 1602 may also be preceded by pick animation 904. Pick animation 904 may appear as a different color depending on the prize to be revealed by the selected pick icon. For example, pick animation 904 may appear as blue to match the blue appearance of wheel boost 1102, as shown in FIGS. 9-10. Additionally, for example, pick animation 904 may appear as yellow to match the yellow appearance of credit value 1602.

As shown in FIG. 16, game controller may cause to be displayed a bonus meter 1604 (e.g., award meter) in secondary game display area 701 to communicate to the player the total credit value to be awarded (e.g., award and/or assign a prize) from the feature game. In the example of FIG. 16, bonus meter 1604 shows 5 credits, which corresponds to the credit value 1602 of 5 credits (e.g., a pick credit value of 5 credits) as revealed following pick animation 904.

Figure 17:
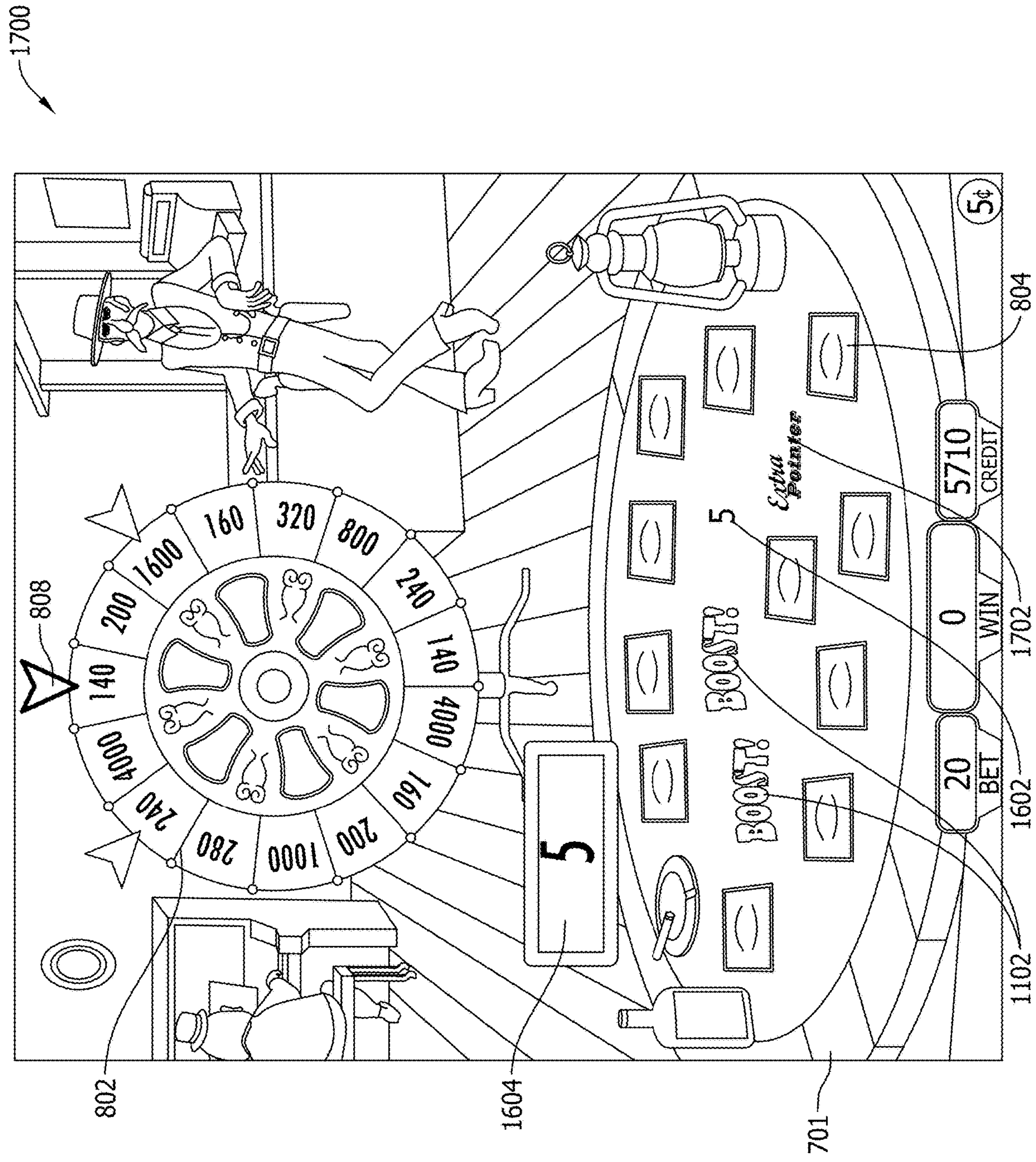

FIGS. 17-20 are example user interfaces or screenshots 1700-2000, respectively, of the feature game of the exemplary electronic game in accordance with the present disclosure. As shown in FIG. 17, more than one of wheel boost 1102 may be available to be selected from pick icons 804. In some examples, each reveal of wheel boost 1102 from a selected pick icon may cause game controller 202 to display an animation of a duplicate of wheel boost 1102 moving towards wheel 802 (as shown in FIG. 12) and/or wheel boost animation 1302 (as shown in FIG. 13). Additionally, game controller 202 may cause to be displayed improved prizes for wheel segments 806 following wheel boost animation 1302 (as shown in FIG. 14), such as shown by the change to the credit values shown on wheel 802 from FIG. 16 to FIG. 17. Additionally, following wheel boost animation 1302, wheel 802 may have a "brightened" appearance, such as from the brighter colors defining wheel segments 806 and/or a new color defining a center area of wheel 802 (as shown in FIG. 17).

As shown in FIG. 17, game controller 202 may cause to be displayed a prize of an extra wheel pointer 1702. In the example of FIG. 17, extra wheel pointer 1702 appears as the words "EXTRA POINTER!" In some examples, extra wheel pointer 1702 may have an alternative appearance than as shown in FIG. 17. Extra wheel pointer 1702 may award a secondary pointer 2002 of wheel 802, in addition to primary pointer 808, to land (e.g., stop) on an additional wheel segment (e.g., stop position) and award an additional prize when wheel 802 stops spinning.

Figure 18:
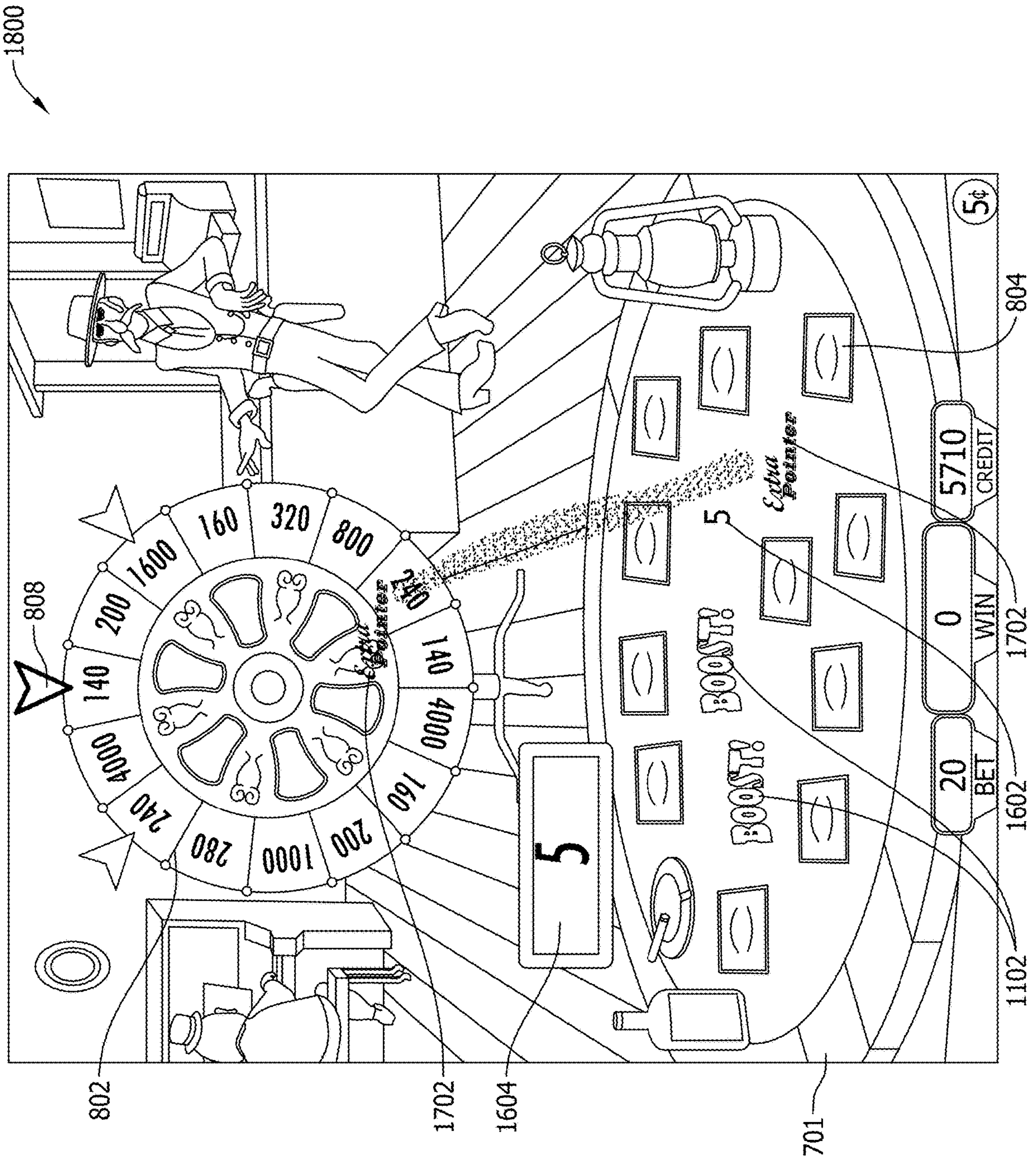
Figure 19:
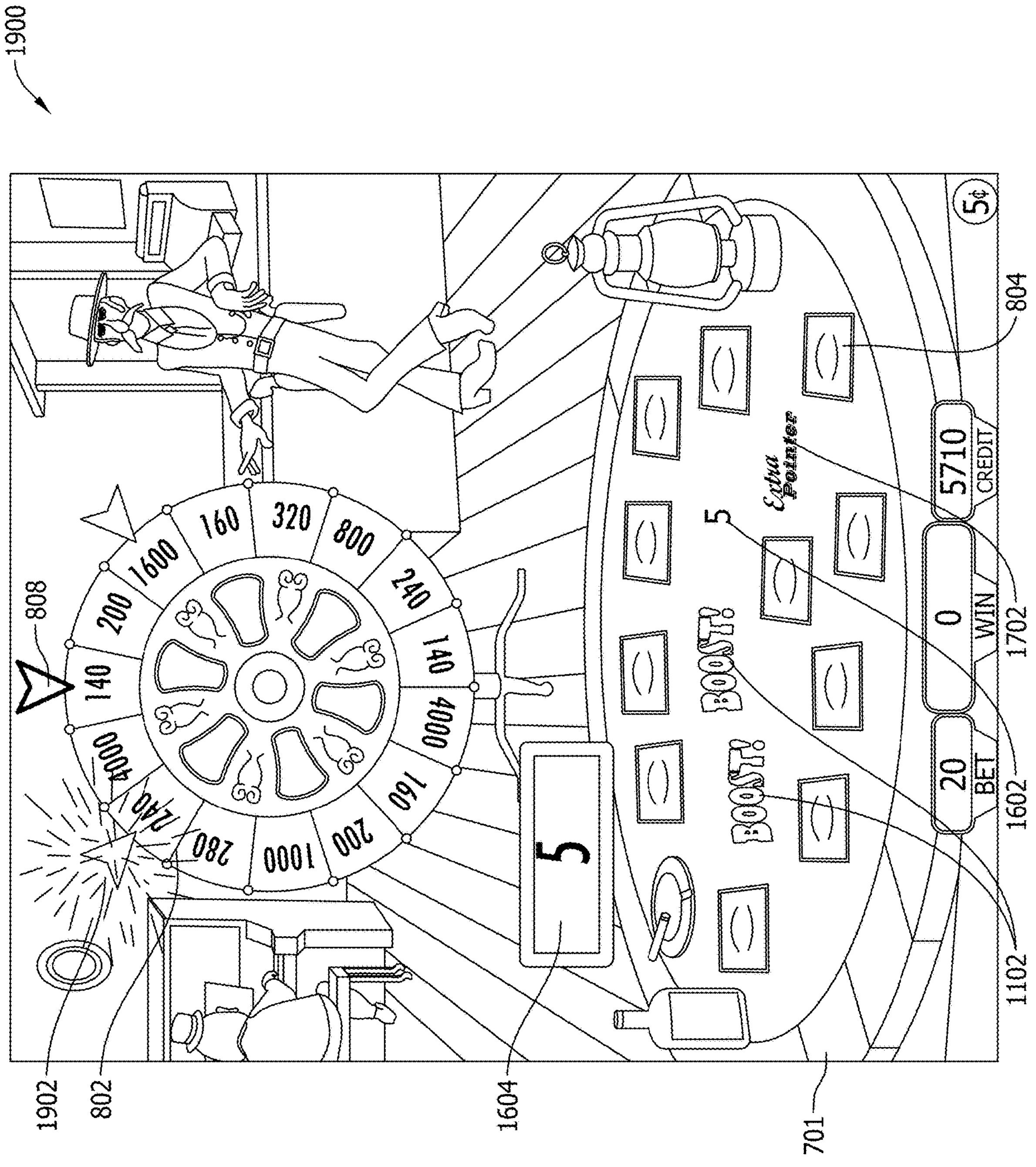
Figure 20:
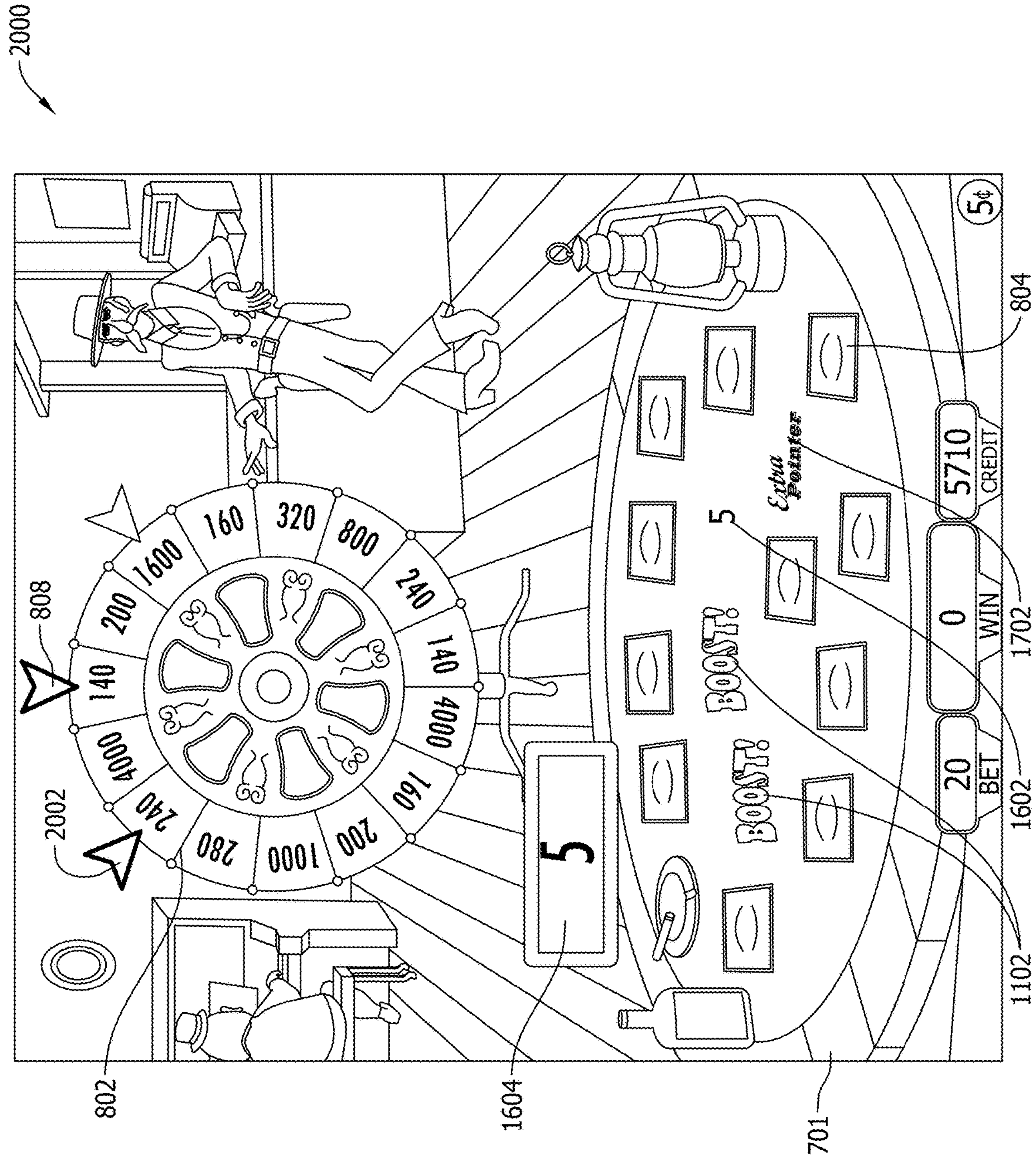

As shown in FIG. 18, game controller 202 may cause to be displayed an animation of a duplicate of extra wheel pointer 1702 moving towards wheel 802 after extra wheel pointer 1702 is revealed by a selected pick icon. The animation of the duplicate of extra wheel pointer 1702 may progress until the duplicate of extra wheel pointer 1702 is over an area of a top edge of wheel 802, circumferentially spaced from primary pointer 808. Additionally, game controller 202 may cause to be displayed a wheel pointer animation 1902 on wheel 802, as shown in FIG. 19. In the example of FIG. 19, wheel pointer animation 1902 appears as a growing circle of light that appears to engulf the area of the top edge of wheel 802 circumferentially spaced from primary pointer 808. Following wheel pointer animation 1902, game controller 202 may cause to be displayed secondary pointer 2002 on wheel 802, as shown in FIG. 20. In the example of FIG. 20, secondary pointer 2002 is positioned to the left of primary pointer 808, spaced one wheel segment away from primary pointer 808. In some examples, secondary pointer 2002 may be positioned differently on wheel 802.

Figure 21:
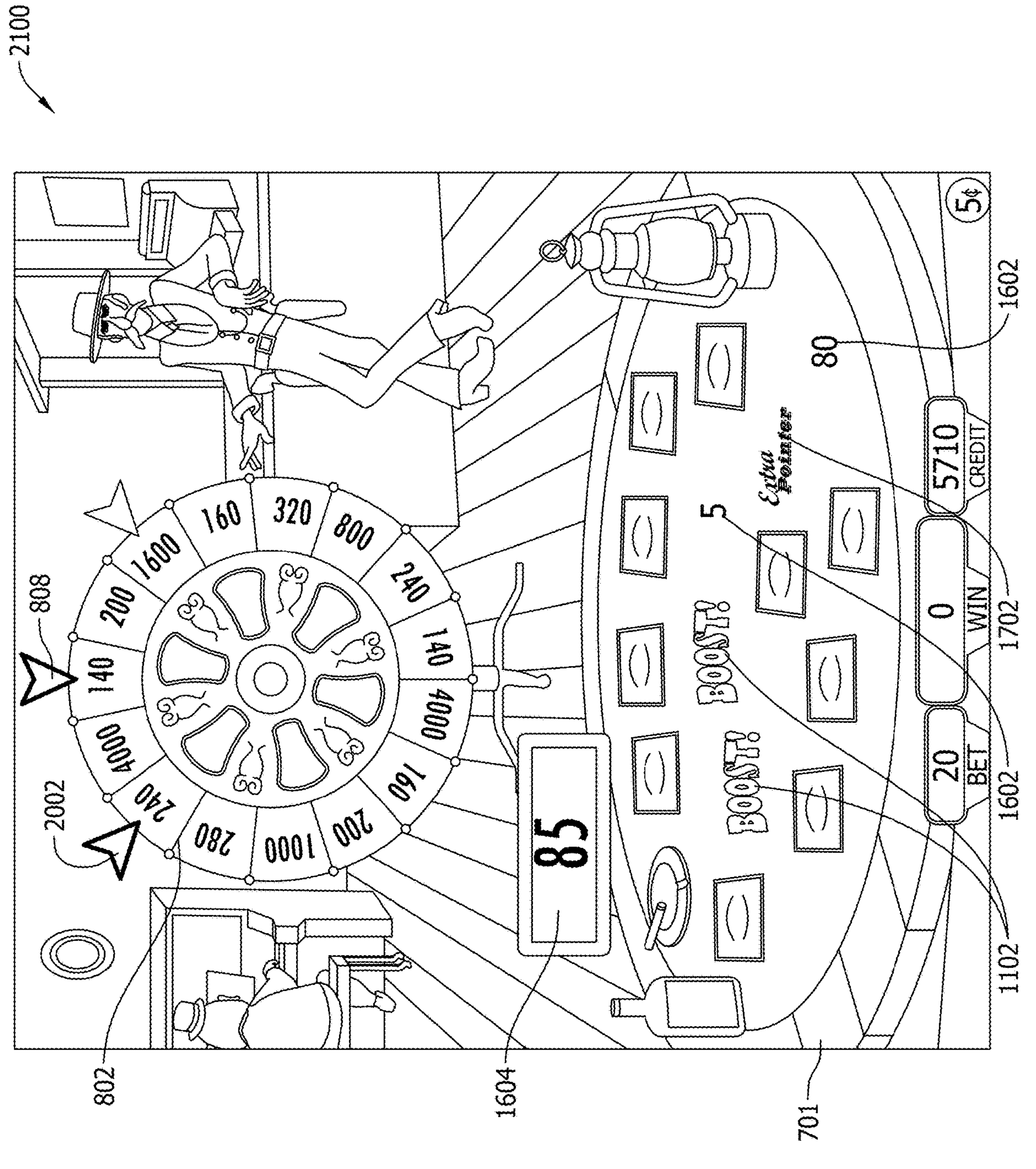
Figure 22:
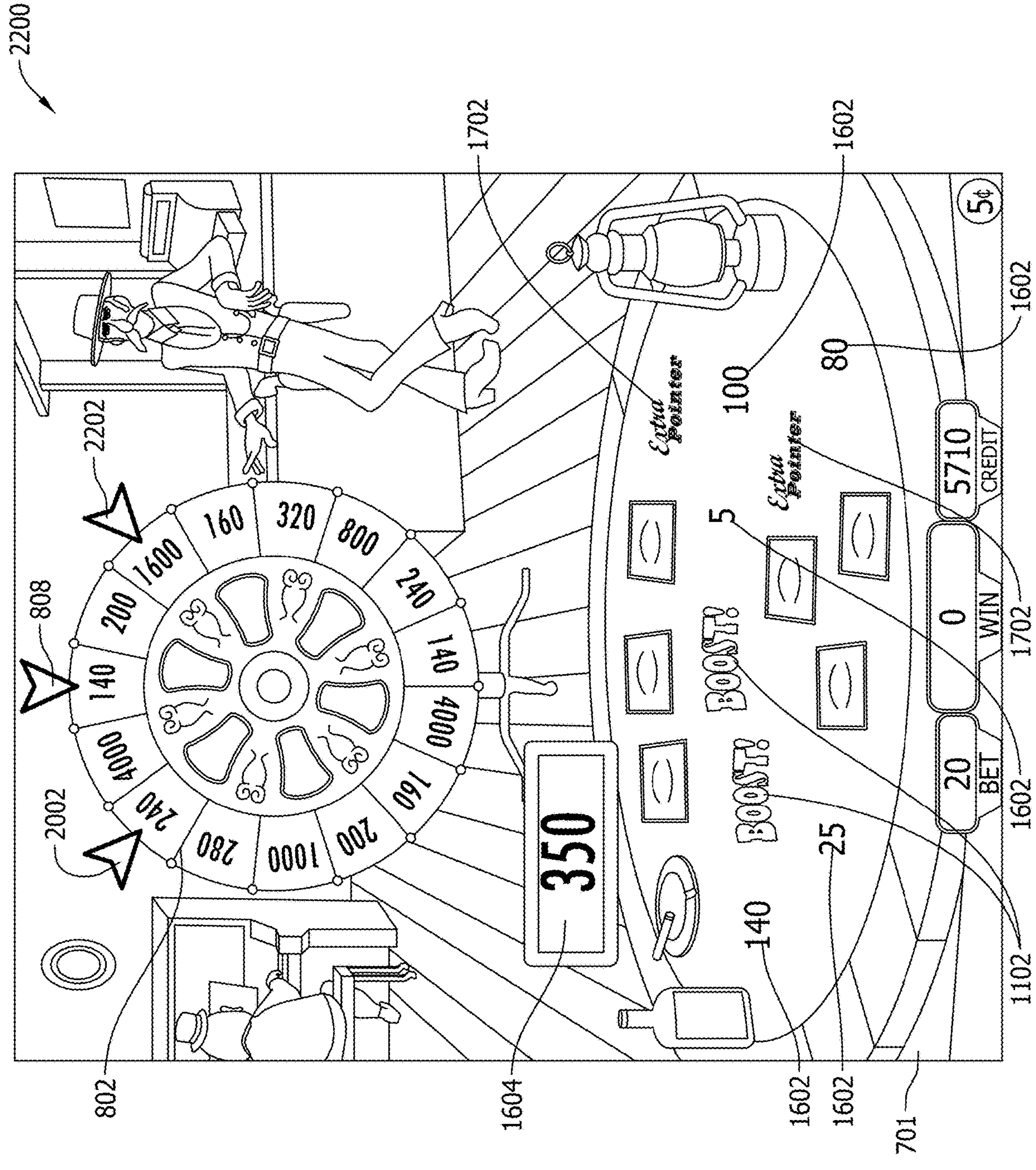

FIGS. 21-22 are example user interfaces or screenshots 1700-2000, respectively, of the feature game of the exemplary electronic game in accordance with the present disclosure. As shown in FIG. 21, more than one of credit value 1602 may be available to be selected from pick icons 804. Game controller (shown in FIG. 2A) may cause to be displayed by bonus meter 1604 a sum of the more than one of credit value 1602. In the example of FIG. 21, bonus meter 1604 shows 85 credits, which corresponds to the sum of the more than one of credit value 1602 of 5 credits and 80 credits. In the example of FIG. 22, bonus meter 1604 shows 350 credits, which corresponds to the sum of the more than one of credit value 1602 of 5 credits, 80 credits, 100 credits, 140 credits, and 25 credits.

As shown in FIG. 22, more than one of extra wheel pointer 1702 may be available to be selected from pick icons 804. As a result, game controller 202 may cause to be displayed secondary pointer 2002 and a tertiary pointer 2202. In the example of FIG. 22, tertiary pointer 2202 is positioned to the right of primary pointer 808, spaced one wheel segment away from primary pointer 808. In some examples, tertiary pointer 2202 may be positioned differently on wheel 802. In some examples, the number of pointers available to be selected from pick icons 804 may be more or less than primary pointer 808, secondary pointer 2002, and tertiary pointer 2202.

Figure 23:
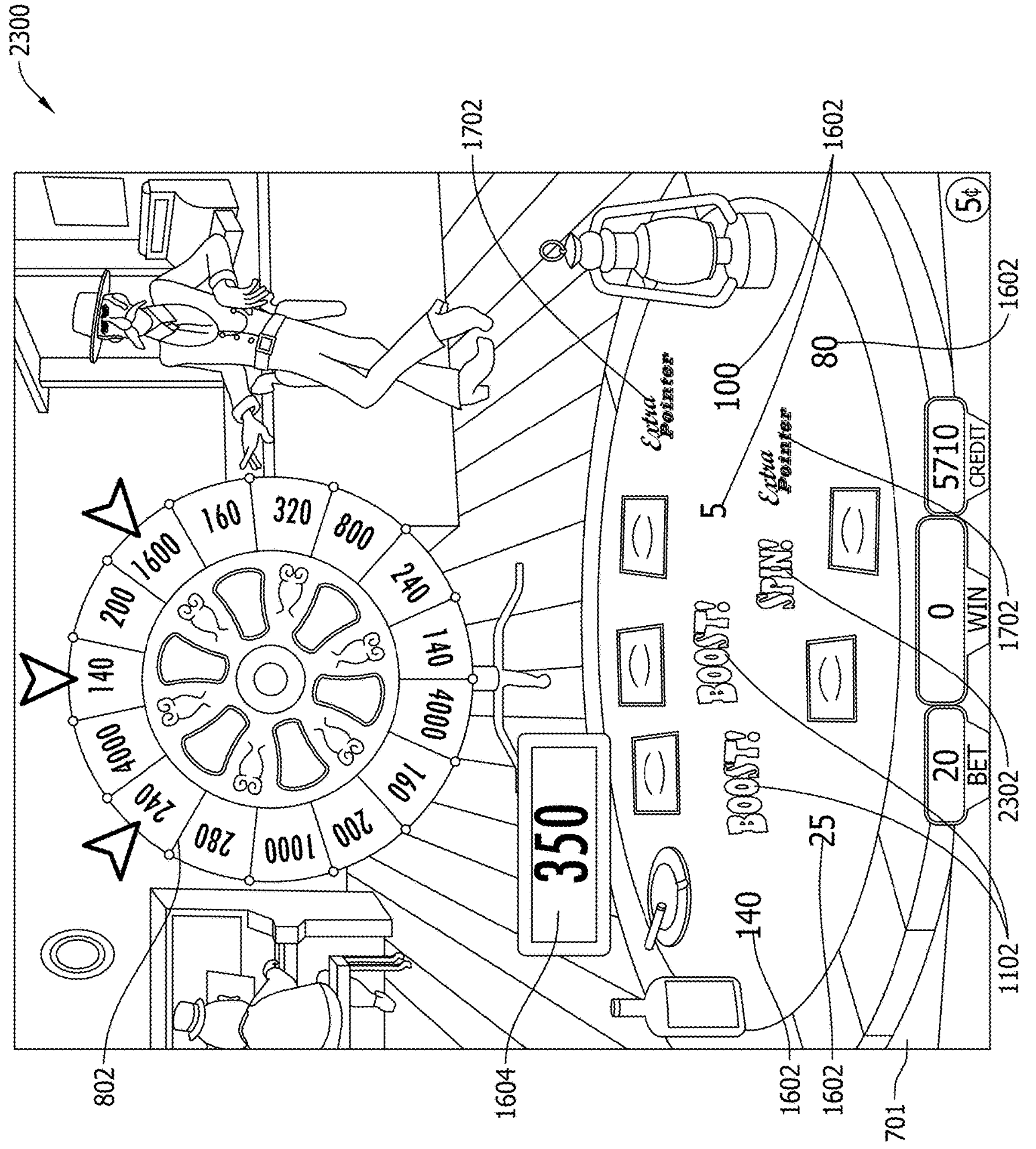
Figure 24:
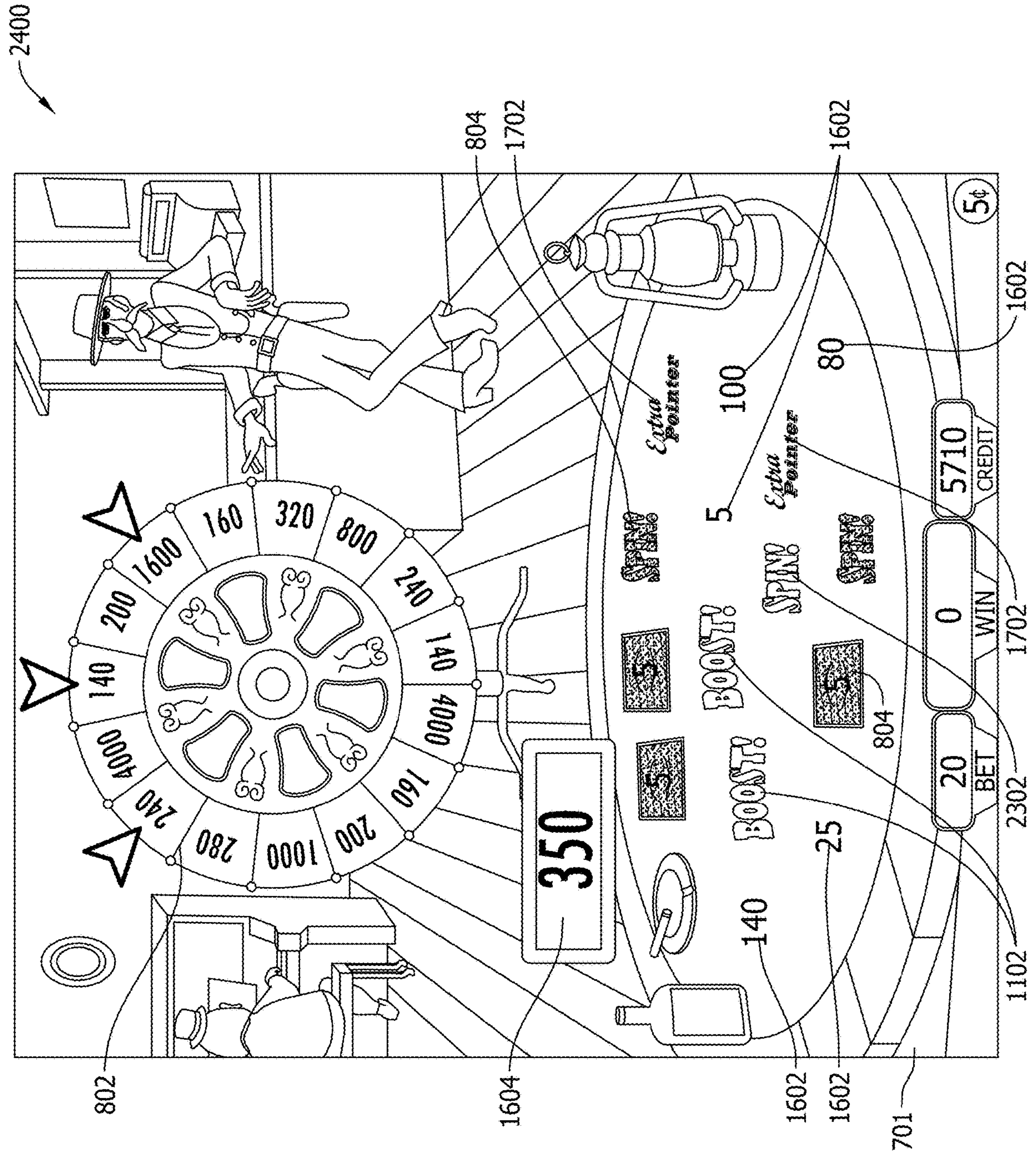
Figure 25:
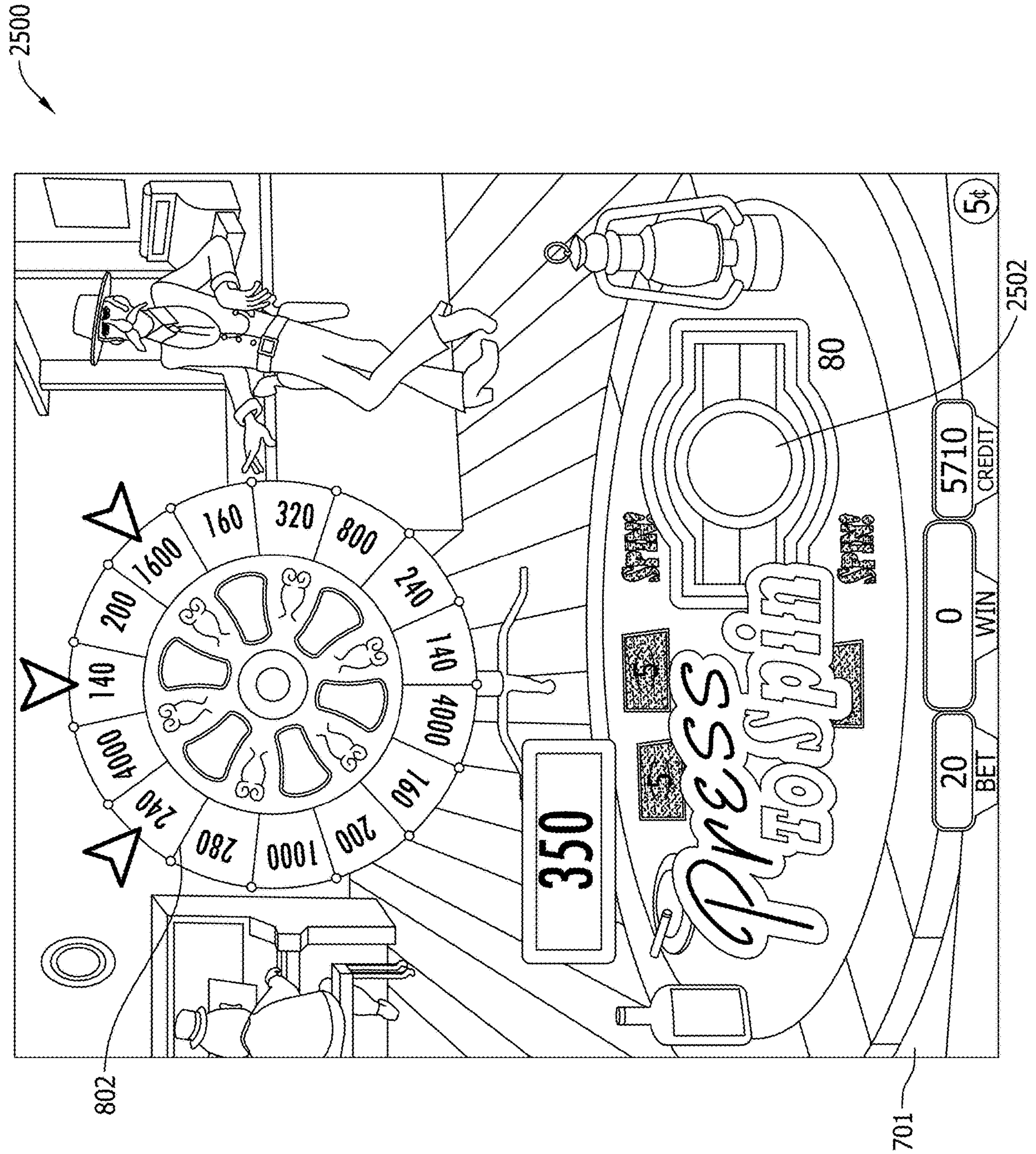

FIGS. 23-29 are example user interfaces or screenshots 2300-2900, respectively, of the feature game of the exemplary electronic game in accordance with the present disclosure. As shown in FIG. 23, game controller 202 may cause to be displayed a prize of a wheel spin 2302. In response to the display of wheel spin 2302, game controller 202 may cause to be displayed a wheel spin trigger 2502 (e.g., wheel spin activator that initiates a wheel spin) to communicate to a player that a spin of wheel 802 is available, as shown in FIG. 25. In some examples, wheel spin trigger 2502 may have an alternative appearance than as shown in FIG. 25.

Figure 26:
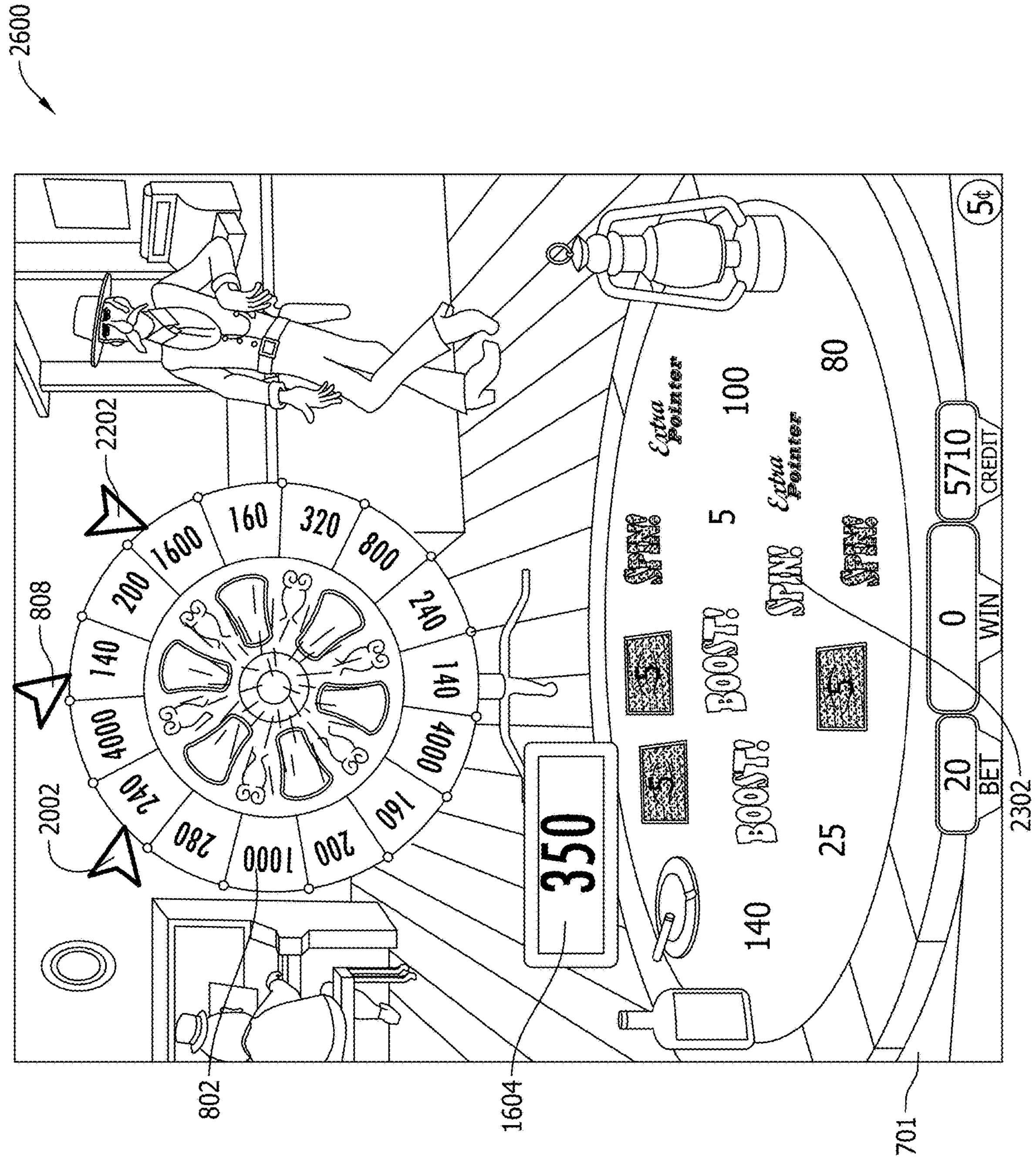

Following a reveal of wheel spin 2302 by a selected pick icon and an interaction of the player when wheel spin trigger 2502, game controller 202 may cause to be displayed a spin of wheel 802. As shown in FIG. 26, primary pointer 808, secondary pointer 2002, and/or tertiary pointer 2202 may appear to tilt in the direction of the spin of wheel 802 to communicate to the player that wheel 802 is spinning. In some examples, the spin of wheel 802 may terminate the feature game. In other examples, the feature game may continue after the spin of wheel 802, allowing the player to continue to make selections of pick icons 804, which may reveal one or more than one of wheel spin 2302 to allow the payer to complete multiple spins of wheel 802 during a single instance of the feature game.

Figure 27:
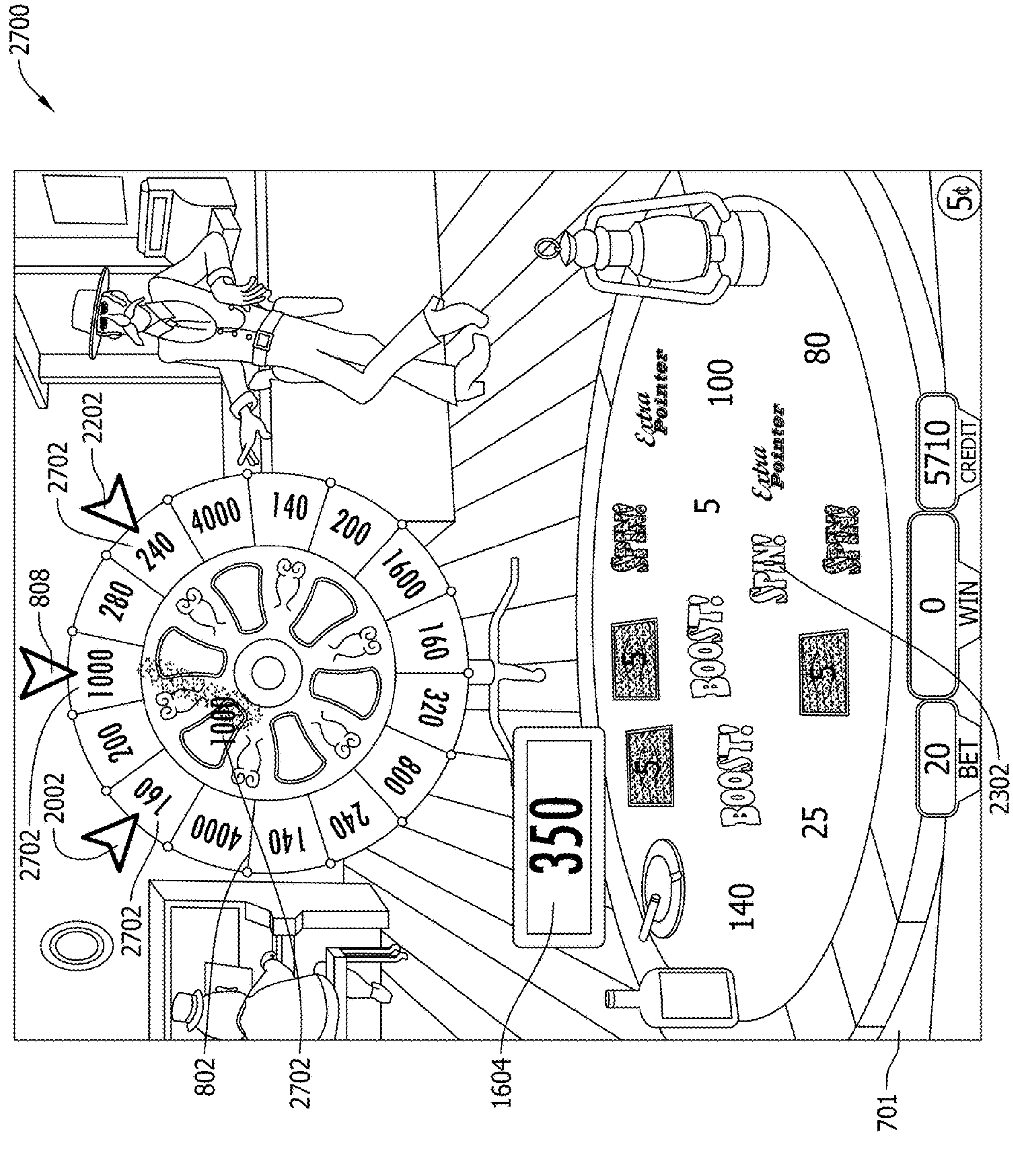

After an amount of time of wheel 802 spinning, game controller 202 may cause to be displayed the termination of the spin of wheel 802. As shown in FIG. 27, after the spin of wheel 802 has been terminated, primary pointer 808, secondary pointer 2002, and/or tertiary pointer 2202 may be pointed to a wheel segment (e.g., a final stop position) of wheel segments 806 to communicate to the player the prizes to be awarded from the spin of wheel 802. In the example of FIG. 27, primary pointer 808, secondary pointer 2002, and tertiary pointer 2202 are pointed to a wheel prize 2702 of 1000 credits, 160 credits, and 240 credits, respectively.

Figure 28:
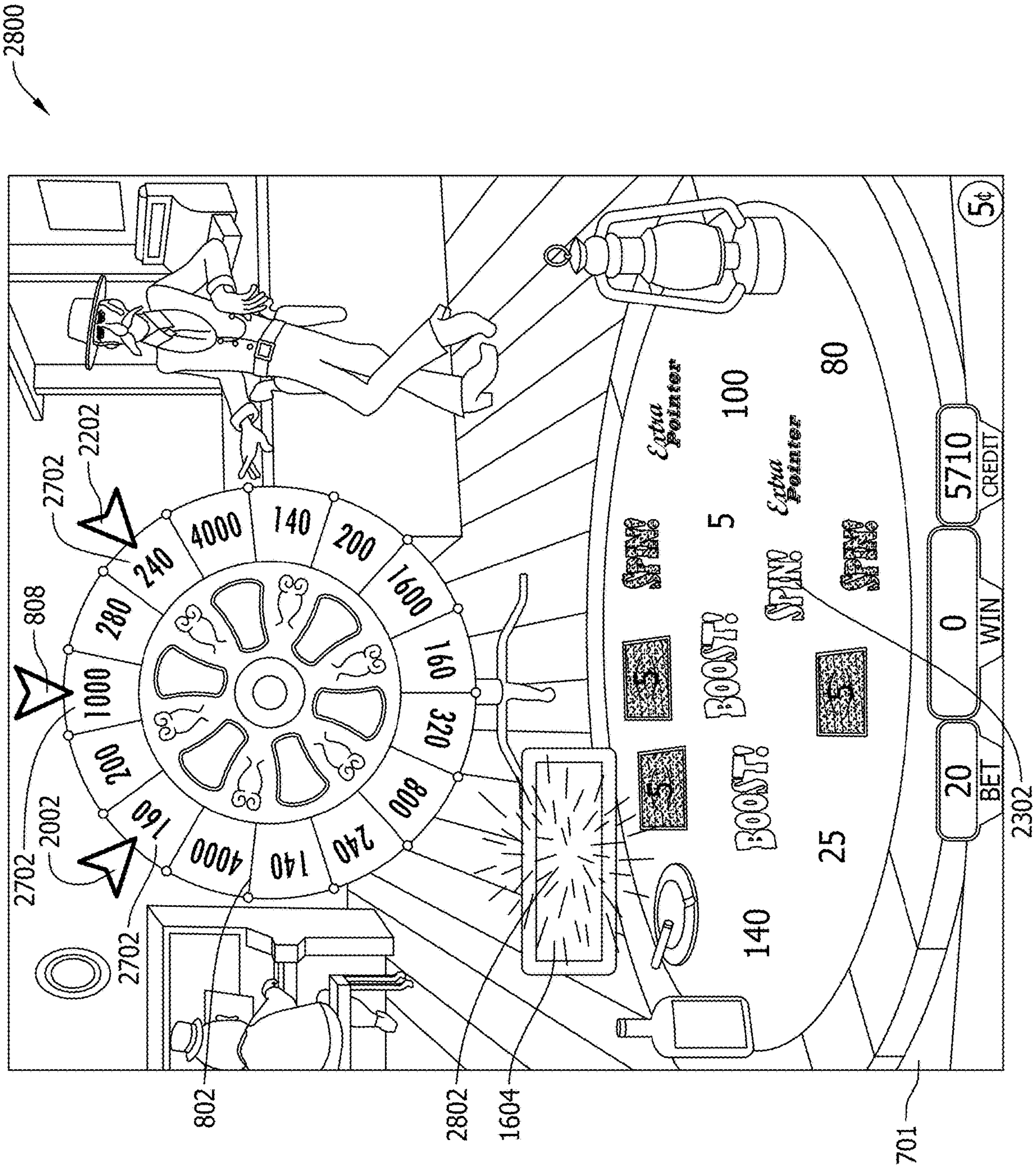

Following the termination of the spin of wheel 802, game controller 202 may cause to be displayed an animation of a duplicate of wheel prize 2702 moving towards bonus meter 1604, as shown in FIG. 27. The animation of the duplicate of wheel prize 2702 may progress until wheel prize 2702 is over or proximate to bonus meter 1604 to communicate to the player the prizes of wheel segments 806 to be awarded from the spin of wheel 802. The animation of the duplicate of wheel prize 2702 may appear as a ray of light (e.g., light ray animation) extending from wheel prize 2702 to bonus meter 1604. Additionally, game controller 202 may cause to be displayed a bonus meter animation 2802 to communicate to the player the impending change to the value displayed by bonus meter 1604, as shown in FIG. 28. Bonus meter animation 2802 may appear as a growing “burst” of light over bonus meter 1604, as shown in FIG. 28. In some example, bonus meter animation 2802 may have an alternative appearance than as shown in FIG. 28.

Figure 29:
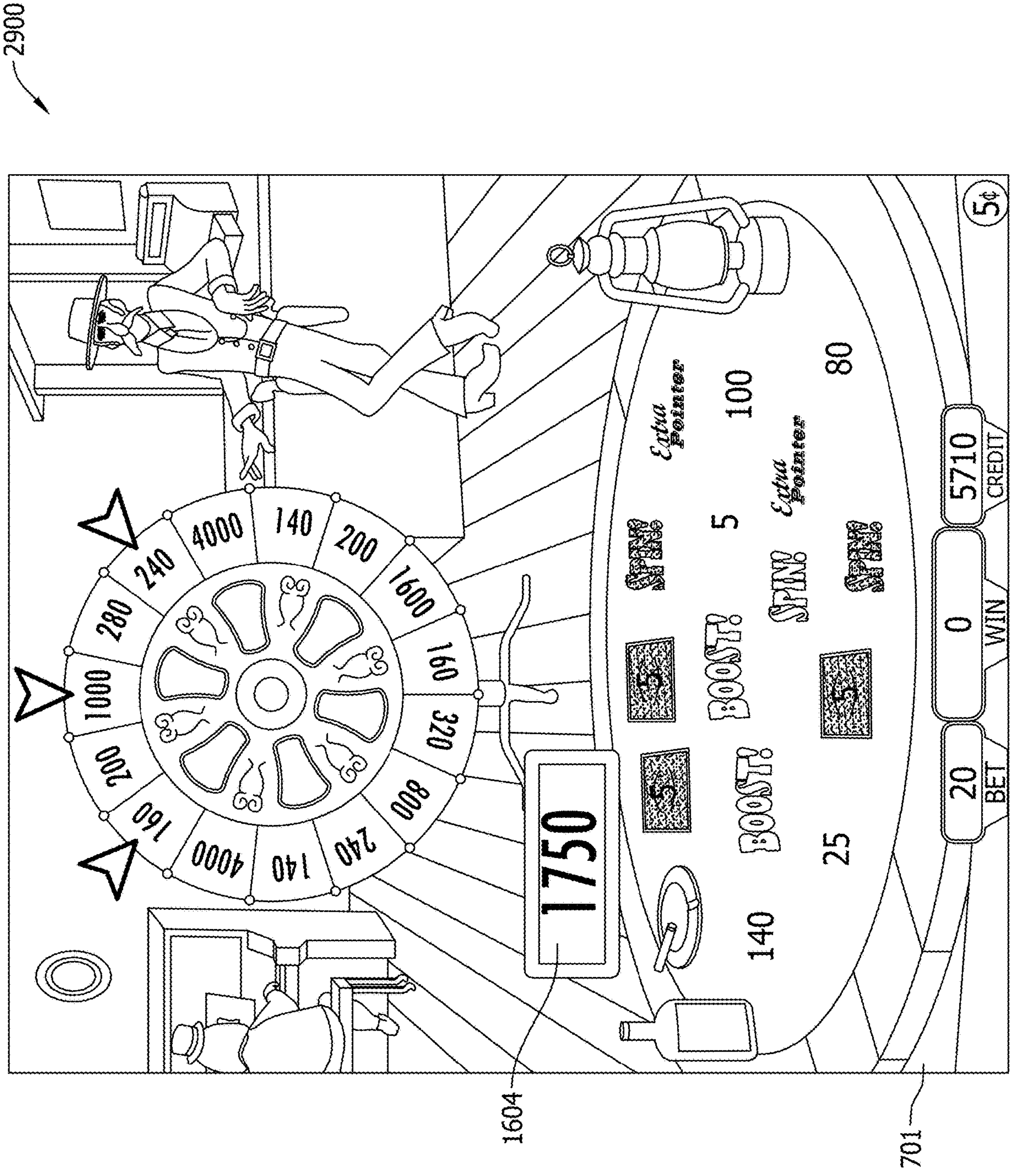

As shown in FIG. 29, game controller 202 may cause to be displayed in bonus meter 1604 a sum of the one or more credit prizes awarded as credit value 1602 revealed by a selected pick icon and wheel prize 2702. In the example of FIG. 29, bonus meter 1604 shows 1750 credits, which corresponds to the sum of 350 credits (the sum of the more than one of credit value 1602, as shown in FIG. 27) and 1400 credits (a sum or more than one of wheel prize 2702 of 1000 credits, 160 credits, and 240 credits). Additionally, as shown in FIGS. 24-29, game controller may cause to be displayed the prizes of pick icons 804 that were not selected prior to the spin of wheel 802. In the examples of FIGS. 24-29, the unselected prizes appear as “grayed out.” In some examples, the unselected prizes may have an alternative appearance.

Figure 30:
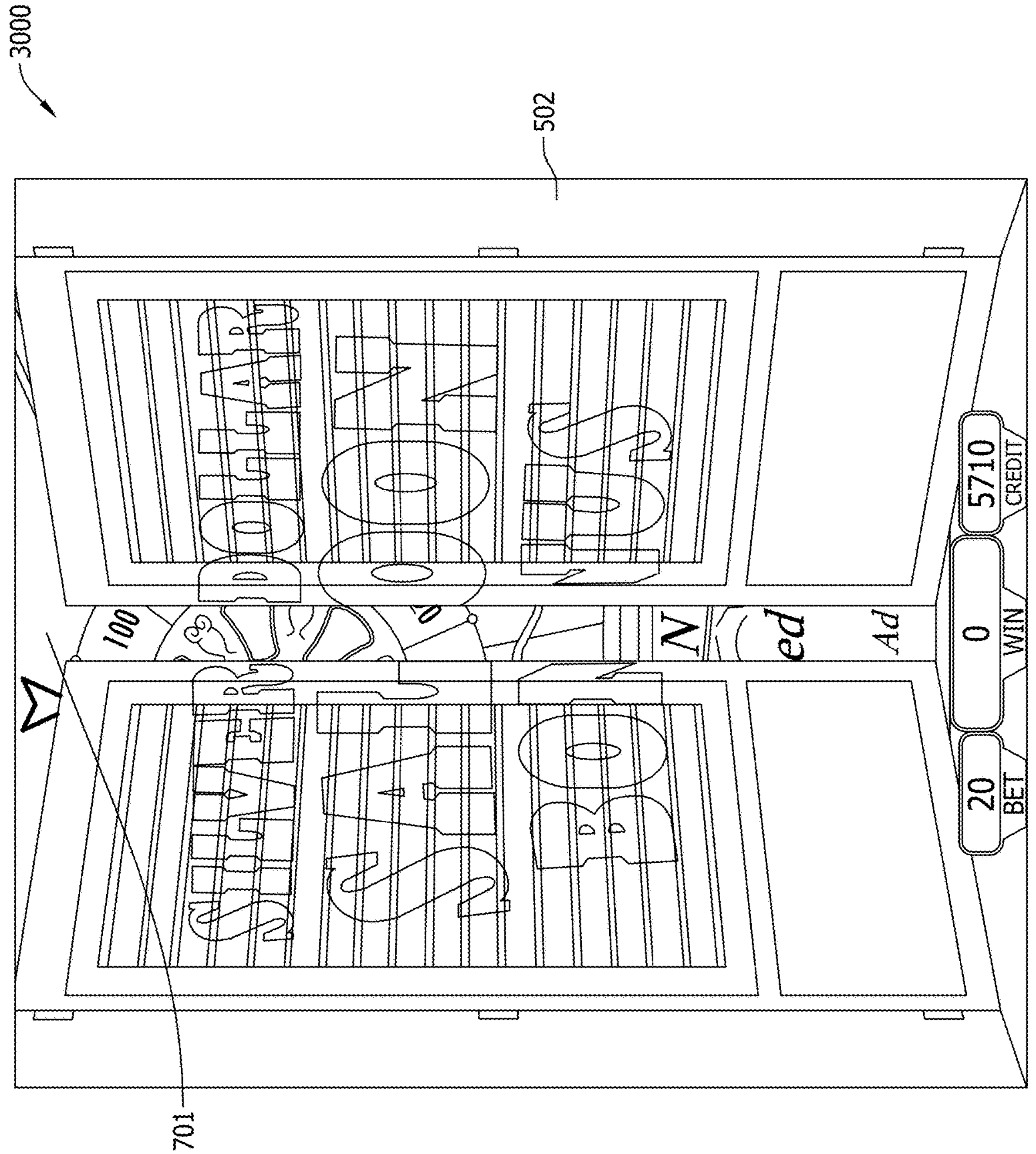
Figure 31:
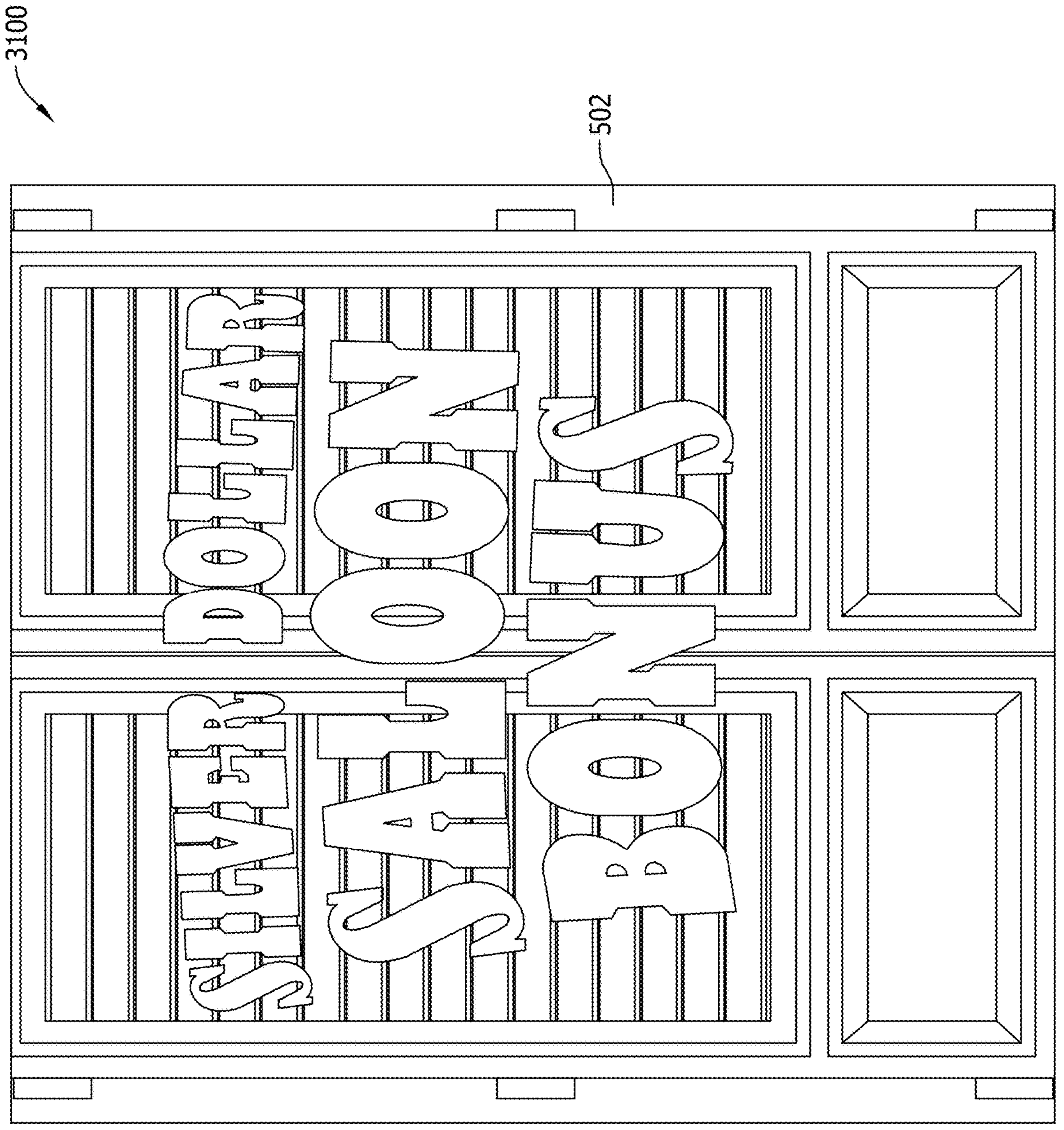

FIGS. 30-31 are example user interfaces or screenshots 3000-3100, respectively, of the feature game of the exemplary electronic game in accordance with the present disclosure. Following the display of the feature game, game controller 202 (shown in FIG. 2A) may cause to be displayed transition animation 502 to transition from the display of the feature game in secondary game display area 701 to the display of the base game in primary game display area 401 (as shown in FIG. 4). Transition animation 502 may be displayed on both of bottom display area 434 and top display area 436, appearing to take up substantially all of secondary game display area 701. In the examples of FIGS. 30-31, transition animation 502 is displayed to appear as a closing and opening of a set of double doors. The start of transition animation 502 may appear as a set of open doors that are closing on the feature game as displayed in secondary game display area 701, as shown in FIG. 30. Transition animation 502 may then progress to appear as a set of closed doors to communication to a player a transition "away from" the feature game, as shown in FIG. 31. In some examples, transition animation 502 may appear as alternative animations, including for different game themes, and thus is not limited to the illustrated examples of FIGS. 30-31.

Figure 32:
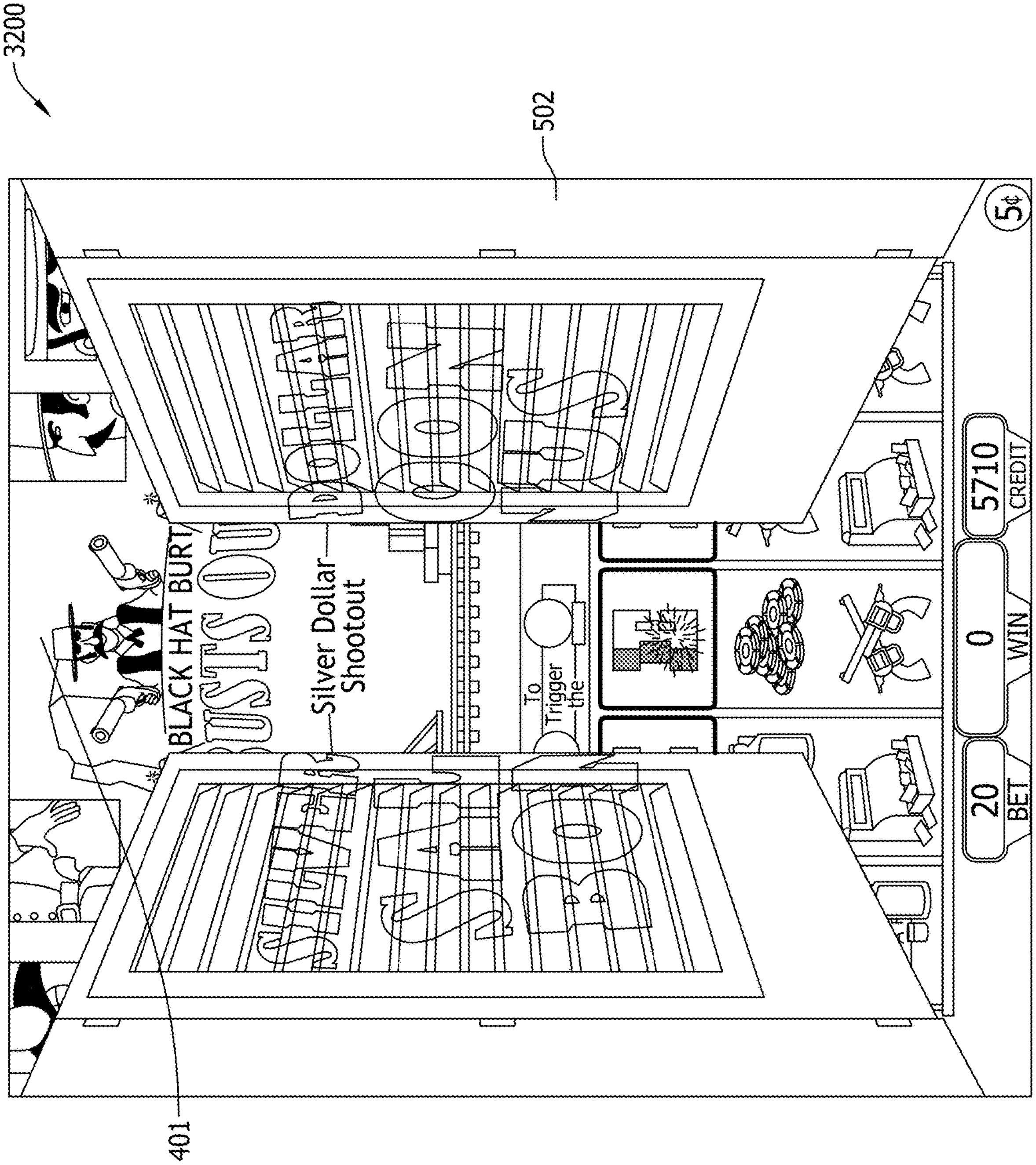
FIG. 32 is an example user interface or screenshot of the base game shown in FIG. 4.

FIG. 32 is an example user interface or screenshot 3200 of the base game of the exemplary electronic game in accordance with the present disclosure. In the example of FIG. 32, transition animation 502 may continue to progress to appear as a set of closed doors that are opening on the base game displayed in primary game display area 401 to communicate to the player a transition "into" the base game from the feature game. Transition animation 502 may appear as alternative animations, including for different game themes, and thus is not limited to the illustrated example of FIG. 32.

Figure 33:
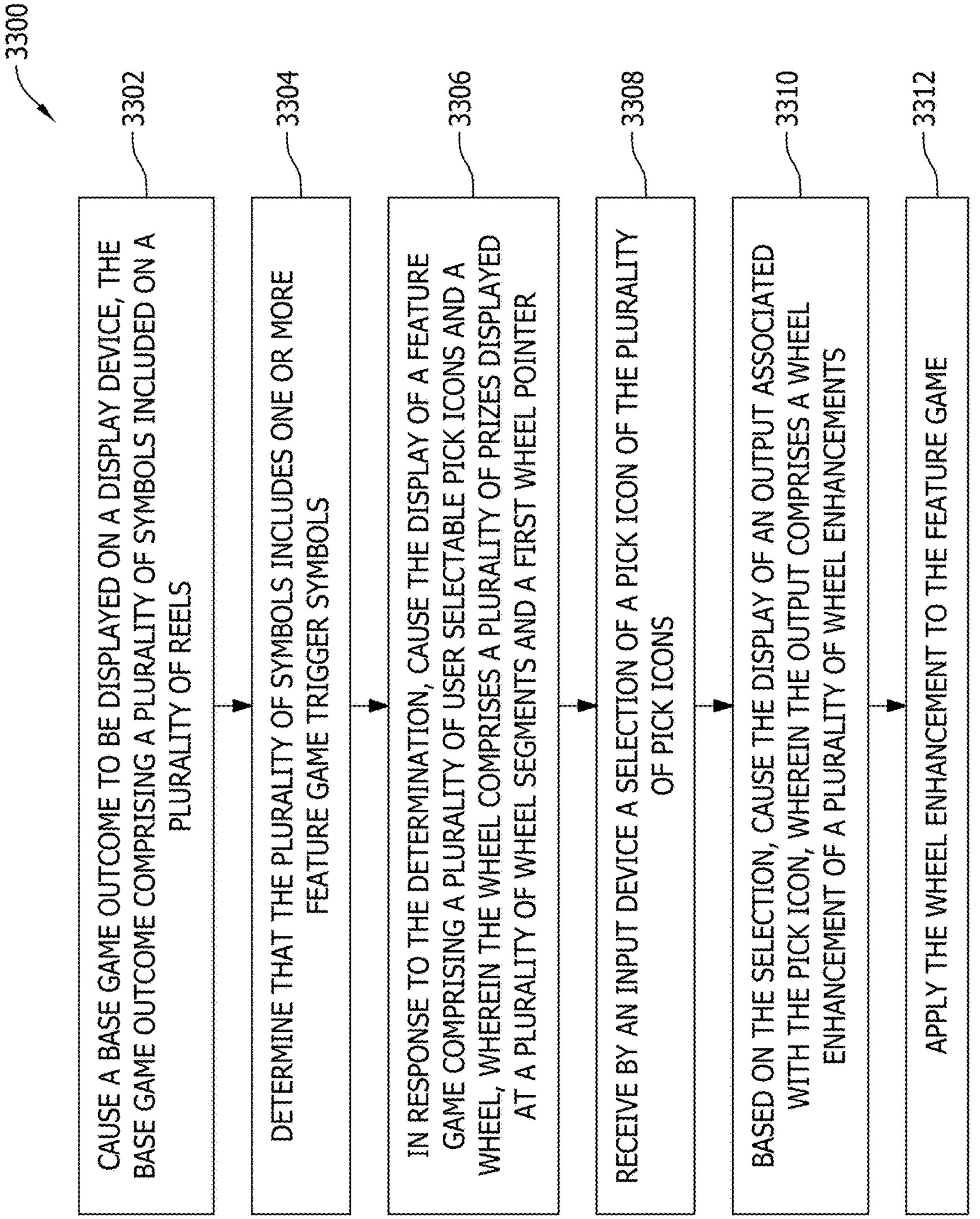
FIG. 33 is an exemplary method of electronic gaming in accordance with the present disclosure.

FIG. 33 illustrates an exemplary method 3300 of electronic gaming in accordance with the present disclosure. In some embodiments, method 3300 includes causing 3302 a base game outcome to be displayed on a display device, the base game outcome comprising a plurality of symbols included on a plurality of reels. Method 3300 also includes determining 3304 that the plurality of symbols includes one or more feature game trigger symbols and, in response to the determination, causing 3306 the display of a feature game comprising a plurality of user selectable pick icons and a wheel, wherein the wheel comprises a plurality of prizes displayed at a plurality of wheel segments and a first wheel pointer. Method 3300 also includes receiving 3308 by an input device a selection of a pick icon of the plurality of pick icons and, based on the selection, causing 3310 the display of an output associated with the pick icon, wherein the output comprises a wheel enhancement of a plurality of wheel enhancements. Method 3300 further includes applying 3312 the wheel enhancement to the feature game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:

a display device;

an input device operable to receive a player input;

a memory device for storing instructions and one or more prize lookup tables including a plurality of feature enhancements; and a processor in communication with the display device, the input device, and the memory device, wherein the instructions, when executed by the processor, cause the processor to:

display a base game outcome on the display device, the base game outcome comprising a plurality of symbols included on a plurality of reels;

determine that the plurality of symbols includes one or more feature game trigger symbols;

in response to the determination, cause the display of a feature game comprising a plurality of user selectable pick icons and a wheel, wherein the wheel comprises a plurality of prizes displayed at a plurality of wheel segments and a first wheel pointer;

receive by the input device a selection of a pick icon of the plurality of pick icons;

in response to receiving the selection of the pick icon:

perform a lookup of the one or more prize lookup tables using a first output of a random number generator (RNG), the lookup identifying a feature enhancement of the plurality of feature enhancements;

assign, based on the lookup and after receiving the selection of the pick icon, the identified feature enhancement to the selected pick icon;

display the identified feature enhancement in association with the selected pick icon; and apply the feature enhancement to the feature game; and perform an additional lookup of the one or more prize lookup tables using a second output of the RNG, the additional lookup identifying an additional feature enhancement of the plurality of feature enhancements; and determine, based on a randomized outcome, a reveal order of the feature enhancement and the additional feature enhancement, wherein assigning the feature enhancement to the selected pick icon is further based on the reveal order.

2. The electronic gaming system of claim 1, wherein the feature enhancement of the selected pick icon comprises a wheel spin.

3. The electronic gaming system of claim 2, wherein the instructions further cause the processor to:

initiate a spin of the wheel;

terminate the spin of the wheel; and assign the prize associated with the wheel segment aligned with the first wheel pointer at a final stop position of the spinning wheel.

4. The electronic gaming system of claim 3, wherein the processor is further caused to display a light ray animation, the light ray animation extending from the final stop position of the spinning wheel to an award meter.

5. The electronic gaming system of claim 2, wherein the feature enhancement comprises an additional wheel pointer including a second wheel pointer.

6. The electronic gaming system of claim 5, wherein the wheel comprises the first wheel pointer and the second wheel pointer.

7. The electronic gaming system of claim 6, wherein the instructions further cause the processor to:

initiate a spin of the wheel;

terminate the spin of the wheel; and assign a sum of the prize associated with the wheel segment aligned with the first wheel pointer at a first final stop position of the spinning wheel and the prize associated with the wheel segment aligned with the second wheel pointer at a second final stop position of the spinning wheel.

8. The electronic gaming system of claim 6, wherein the processor is further caused to display a light burst animation on an edge of the wheel, thereby displaying adding the second wheel pointer.

9. The electronic gaming system of claim 1, wherein the plurality of prizes comprises a plurality of credit values.

10. The electronic gaming system of claim 9, wherein the feature enhancement comprises a wheel boost to increase a value of each of the plurality of credit values.

11. The electronic gaming system of claim 1, wherein the instructions further cause the processor to:

receive by the input device a second selection of a second pick icon of the plurality of pick icons;

based on the second selection, display the additional feature enhancement associated with the second pick icon, wherein the additional feature enhancement comprises a credit value; and assign the credit value.

12. The electronic gaming system of claim 1, wherein the instructions further cause the processor to:

receive by the input device a second selection of a second pick icon of the plurality of pick icons;

assign, based on the additional lookup, the additional feature enhancement to the second pick icon;

display the additional feature enhancement in association with the second pick icon; and apply the additional feature enhancement to the feature game.

13. The electronic gaming system of claim 1, wherein the feature enhancement of the selected pick icon is randomized based on a plurality of pick icon outcomes.

14. A method of electronic gaming, the method comprising:

causing a base game outcome to be displayed on a display device, the base game outcome comprising a plurality of symbols included on a plurality of reels;

determining that the plurality of symbols includes one or more feature game trigger symbols;

in response to the determination, causing display of a feature game comprising a plurality of user selectable pick icons and a wheel, wherein the wheel comprises a plurality of prizes displayed at a plurality of wheel segments and a first wheel pointer;

receiving by an input device a selection of a pick icon of the plurality of pick icons;

in response to receiving the selection of the pick icon:

performing a lookup of one or more prize lookup tables using a first output of a random number generator (RNG), the lookup identifying a feature enhancement of a plurality of feature enhancements;

assigning, based on the lookup and after receiving the selection of the pick icon, the identified feature enhancement to the selected pick icon;

displaying the identified feature enhancement in association with the selected pick icon; and applying the feature enhancement to the feature game; and performing an additional lookup of the one or more prize lookup tables using a second output of the RNG, the additional lookup identifying an additional feature enhancement of the plurality of feature enhancements; and determine, based on a randomized outcome, a reveal order of the feature enhancement and the additional feature enhancement, wherein assigning the feature enhancement to the selected pick icon is further based on the reveal order.

15. The method of claim 14, wherein the feature enhancement comprises a wheel spin, the method further comprising:

initiating a spin of the wheel;

terminating the spin of the wheel; and assigning a prize associated with the wheel segment aligned with the first wheel pointer at a final stop position of the spinning wheel.

16. The method of claim 15, further comprising:

applying the feature enhancement to the feature game, wherein the feature enhancement comprises an additional wheel pointer including a second wheel pointer;

causing the display of the wheel, wherein the wheel comprises the first wheel pointer and the second wheel pointer; and assigning a sum of the prize associated with the wheel segment aligned with the first wheel pointer at a first final stop position of the spinning wheel and the prize associated with the wheel segment aligned with the second wheel pointer at a second final stop position of the spinning wheel.

17. The method of claim 14, wherein causing display of the feature game further comprises the wheel comprising a plurality of credit values displayed at the plurality of wheel segments.

18. The method of claim 17, wherein applying the feature enhancement to the feature game further comprises the feature enhancement comprising a wheel boost to increase a value of each of the plurality of credit values.

19. The method of claim 14, further comprising:

receiving by the input device a second selection of a second pick icon of the plurality of pick icons;

based on the second selection, causing the display of the additional feature enhancement associated with the second pick icon; and applying the additional feature enhancement to the feature game.

* * * * *